US008208627B2

(12) United States Patent
Pauker et al.

(10) Patent No.: US 8,208,627 B2
(45) Date of Patent: Jun. 26, 2012

(54) FORMAT-PRESERVING CRYPTOGRAPHIC SYSTEMS

(75) Inventors: Matthew J. Pauker, San Francisco, CA (US); Terence Spies, Mountain View, CA (US)

(73) Assignee: Voltage Security, Inc., Cupertino, CA (US)

( * ) Notice: Subject to any disclaimer, the term of this patent is extended or adjusted under 35 U.S.C. 154(b) by 442 days.

(21) Appl. No.: 12/432,258

(22) Filed: Apr. 29, 2009

(65) Prior Publication Data

US 2010/0111297 A1    May 6, 2010

Related U.S. Application Data

(60) Provisional application No. 61/050,160, filed on May 2, 2008.

(51) Int. Cl.
*H04K 1/00* (2006.01)
(52) U.S. Cl. ............................................ 380/28; 380/29
(58) Field of Classification Search .................... 380/28, 380/29; 713/174, 189
See application file for complete search history.

(56) References Cited

U.S. PATENT DOCUMENTS

| | | | |
|---|---|---|---|
| 6,182,216 B1 * | 1/2001 | Luyster | ........................ 713/168 |
| 6,836,765 B1 | 12/2004 | Sussman | |
| 6,885,748 B1 | 4/2005 | Wang | |
| 7,418,098 B1 | 8/2008 | Mattsson | |
| 2003/0028481 A1 | 2/2003 | Flitcroft et al. | |
| 2003/0191719 A1 | 10/2003 | Ginter et al. | |
| 2005/0132070 A1 | 6/2005 | Redlich et al. | |
| 2008/0170693 A1 | 7/2008 | Spies et al. | |

FOREIGN PATENT DOCUMENTS

| | | |
|---|---|---|
| EP | 1 209 550 | 5/2002 |
| WO | 2006/107777 | 10/2006 |

OTHER PUBLICATIONS

Pauker, Mathew J. et. al, U.S. Appl. No. 11/635,756, filed Dec. 6, 2006.

Brightwell, Michael et al., "Using Datatype-Preserving Encryption to Enhance Data Warehouse Security," 20th National Information Systems Security Conference, Oct. 7-10, 1997- Baltimore, Maryland.

Black, John et al. "Ciphers with Arbitrary Finite Domains," RSA Conference 2002, San Jose, CA, USA, Feb. 18-22, 2002, Proceedings, "Lecture Notes in Computer Science," 2271 Springer 2002, ISBN 3-540-43224-8, pp. 114-130.

(Continued)

*Primary Examiner* — Hosuk Song
(74) *Attorney, Agent, or Firm* — Treyz Law Group; G. Victor Treyz; Nancy Y. Ru

(57) ABSTRACT

Format-preserving encryption and decryption processes are provided. The encryption and decryption processes may use a block cipher. A string that is to be encrypted or decrypted may be converted to a unique binary value. The block cipher may operate on the binary value. If the output of the block cipher that is produced is not representative of a string that is in the same format as the original string, the block cipher may be applied again. The block cipher may be repeatedly applied in this way during format-preserving encryption operations and during format-preserving decryption operations until a format-compliant output is produced. Selective access may be provided to portions of a string that have been encrypted using format-preserving encryption.

16 Claims, 18 Drawing Sheets

OTHER PUBLICATIONS

J. Black and P. Rogaway, "Ciphers with Arbitrary Finite Domains," [online]. Feb. 12, 2001 <URL::eprint.iacr.org/2001/012.ps>.
Thomas Stutz and Andreas Uhl, "On Format-Compliant Iterative Encryption of JPEG2000," Proceedings of the Eighth IEEE International Symposium on Multimedia (ISM '06), 2006.
Burnett, Steven D. et al., U.S. Appl. No. 12/435,635, filed May 5, 2009.
Martin, Luther W. et al., U.S. Appl. No. 12/610,221, filed Oct. 30, 2009.

* cited by examiner

FORMAT-PRESERVING CRYPTOGRAPHIC SYSTEMS

This application claims the benefit of provisional patent application No. 61/050,160, filed May 2, 2008, which is hereby incorporated by reference herein in its entirety.

BACKGROUND OF THE INVENTION

This invention relates to cryptography and more particularly, to preserving data formats during encryption and decryption operations.

Cryptographic systems are used to secure data in a variety of contexts. For example, encryption algorithms are used to encrypt sensitive information such as financial account numbers, social security numbers, and other personal information. By encrypting sensitive data prior to transmission over a communications network, the sensitive data is secured, even if it passes over an unsecured communications channel. Sensitive data is also sometimes encrypted prior to storage in a database. This helps to prevent unauthorized access to the sensitive data by an intruder.

Commonly used encryption algorithms include the Advanced Encryption Standard (AES) encryption algorithm and the Data Encryption Standard (DES) encryption algorithm. Using these types of algorithms, an organization that desires to secure a large quantity of sensitive information can place the sensitive information in a data file. The data file can then be encrypted in its entirety using the AES or DES algorithms.

Encrypting entire files of data can be an effective technique for securing large quantities of data. However, bulk encryption of files can be inefficient and cumbersome because it is not possible to selectively access a portion of the encrypted data in an encrypted file. Even if an application only needs to have access to a portion of the data, the entire file must be decrypted. Without the ability to selectively decrypt part of a file, it can be difficult to design a data processing system that provides different levels of data access for different application programs and for different personnel.

To avoid the difficulties associated with encrypting entire files of sensitive data, it would be desirable to be able to apply cryptographic techniques such as the AES and DES encryption algorithms with a finer degree of granularity. For example, it might be desirable to individually encrypt social security numbers in a database table, rather than encrypting the entire table. This would allow software applications that need to access information in the table that is not sensitive to retrieve the desired information without decrypting the entire table.

Conventional encryption techniques can, however, significantly alter the format of a data item. For example, encryption of a numeric string such as a credit card number may produce a string that contains non-numeric characters or a string with a different number of characters. Because the format of the string is altered by the encryption process, it may not be possible to store the encrypted string in the same type of database table that is used to store unencrypted versions of the string. The altered format of the encrypted string may therefore disrupt software applications that need to access the string from a database. The altered format may also create problems when passing the encrypted string between applications. Because of these compatibility problems, organizations may be unable to incorporate cryptographic capabilities into legacy data processing systems.

It would therefore be desirable to be able to provide cryptographic tools that are capable of encrypting and decrypting data without altering the format of the data.

SUMMARY OF THE INVENTION

In accordance with the present invention, format-preserving encryption and decryption algorithms are provided. Using format-preserving encryption, a plaintext string such as a string of letters and digits can be encrypted to produce ciphertext composed of letters and digits in the same format as the original plaintext string. During format-preserving decryption, ciphertext can be converted into plaintext in the same format as the ciphertext.

The format-preserving encryption and decryption algorithms may be implemented using a block cipher. During encryption, the block cipher may be applied to a plaintext string. If the resulting block cipher output does not correspond to a string that is in the same format as the original string, the block cipher can be applied one or more additional times. Once the block cipher output is format-compliant, the block cipher output can be used to produce the encrypted string. The block cipher may also be applied in this fashion during format-preserving decryption operations.

Strings may be made up of characters. During format-preserving encryption and decryption operations, the strings may be converted to numeric values using an index. During these encoding operations, unique binary values may be produced for each string using a binary encoding function. The binary values that are produced may be operated upon using the block cipher.

Different users (applications) may be provided with selective access to different portions of a string that has been encrypted using format-preserving encryption. For example, a string may have first and second plaintext parts. The first plaintext part may be encrypted using a first cryptographic key to produce first ciphertext. By using format-preserving encryption, the first ciphertext may have the same format as the first plaintext part. Both the second plaintext part and the first ciphertext may be encrypted together using format-preserving encryption and a second cryptographic key to produce second ciphertext that is in the same format as first ciphertext and the second plaintext part. With this type of arrangement, the ciphertext has the same format as the original string that is composed of the first and second plaintext parts.

To provide selective access to the different portions of plaintext, a first user may be provided with the first and second keys and a second user may be provided with the second key but not the first key. This allows the second user to access the second plaintext part but not the first plaintext part and allows the first user to access both the first and second plaintext parts.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
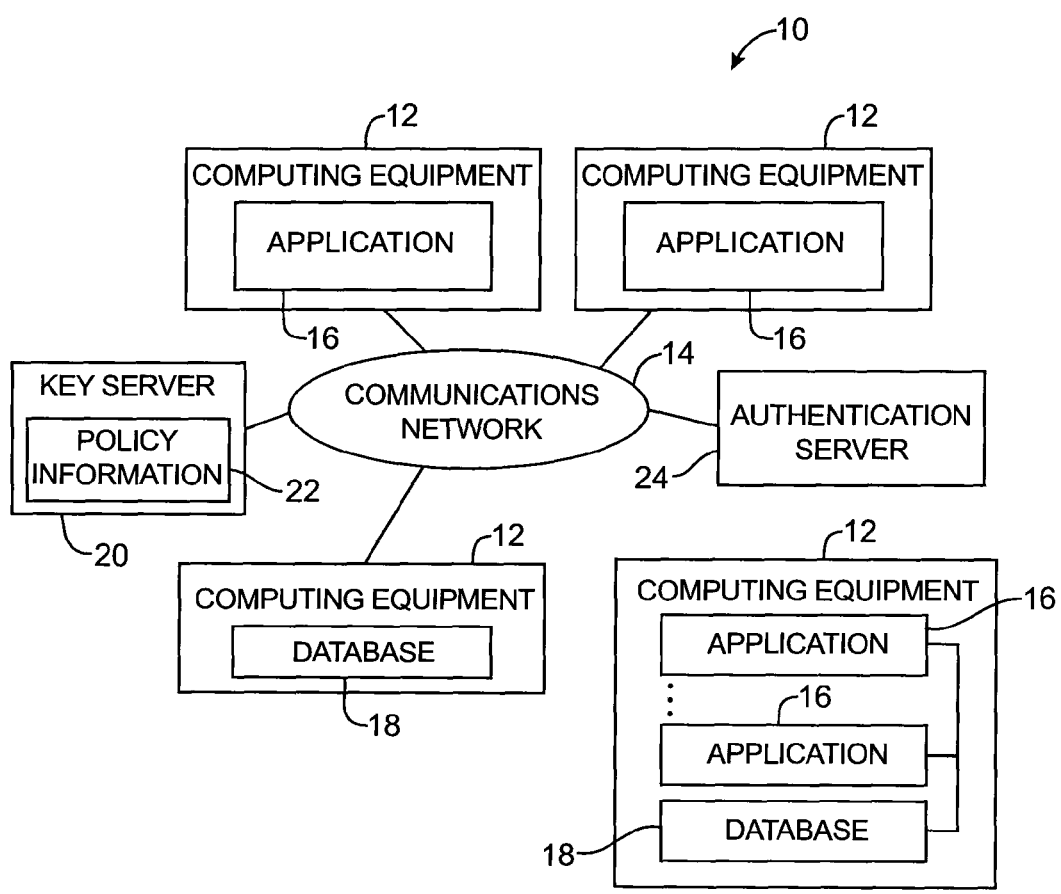
FIG. 1 is a diagram of an illustrative system environment in which cryptographic tools with format-preserving encryption and decryption features may be used in accordance with an embodiment of the present invention.

An illustrative cryptographic system 10 in accordance with the present invention is shown in FIG. 1. System 10 includes computing equipment 12 and communications network 14. The computing equipment 12 may include one or more personal computers, workstations, computers configured as servers, mainframe computers, portable computers, etc. The communications network 14 may be a local area network or a wide area network such as the internet. System 10 may be used in processing data for one or more organizations.

Computing equipment 12 may be used to support applications 16 and databases 18. In computing equipment 12 in which multiple applications run on the same computer platform, applications and databases may communicate with each other directly. If desired, applications 16 can communicate with each other and with databases 18 remotely using communications network 14. For example, an application 16 that is run on a computer in one country may access a database 18 that is located in another country or an application 16 running on one computer may use network 14 to transmit data to an application 16 that is running on another computer. Applications 16 may be any suitable applications, such as financial services applications, governmental record management applications, etc.

The data that is handled by system 10 includes sensitive items such as individuals' addresses, social security numbers and other identification numbers, license plate numbers, passport numbers, financial account numbers such as credit card and bank account numbers, telephone numbers, email addresses, etc. In some contexts, information such as individuals' names may be considered sensitive.

In a typical scenario, a credit card company maintains a database 18 of account holders. The database lists each account holder's name, address, credit card number, and other account information. Representatives of the credit card company may be located in many different geographic locations. The representatives may use various applications 16 to access the database. For example, a sales associate may retrieve telephone numbers of account holders to make sales calls using one application, whereas a customer service representative may retrieve account balance information using another application. Automated applications such as error-checking housekeeping applications may also require access to the database.

To prevent unauthorized access to sensitive data and to comply with data privacy regulations and other restrictions, sensitive data may need to be encrypted. Encryption operations may be performed before data is passed between applications 16 or before data is stored in a database 18. Because various applications may need to access different types of data, the system 10 preferably allows data to be selectively encrypted. As an example, each of the telephone numbers and each of the credit card numbers can be individually encrypted using separate cryptographic keys. With this type of selective encryption arrangement, applications that require access to telephone numbers need not be provided with access to credit card numbers and vice versa.

To support encryption and decryption operations in system 10 applications 16 may be provided with encryption and decryption engines. For example, an application 16 that accesses a database 18 over a communications network 14 may have an encryption engine for encrypting sensitive data before it is provided to the database 18 and stored and may have a decryption engine for use in decrypting encrypted data that has been retrieved from database 18 over communications network 14. As another example, a first application may have an encryption engine for encrypting sensitive data before passing the encrypted data to a second application. The second application may have a decryption engine for decrypting the encrypted data that has been received from the first application.

Any suitable technique may be used to provide applications 16 with encryption and decryption capabilities. For example, the encryption and decryption engines may be incorporated into the software code of the applications 16, may be provided as stand-alone applications that are invoked from within a calling application, or may be implemented using a distributed arrangement in which engine components are distributed across multiple applications and/or locations.

Key server 20 may be used to generate and store cryptographic keys that are used by the encryption and decryption engines. Key server 20 may include policy information 22 that key server 20 uses in determining whether to fulfill key requests. As an example, policy information 22 may include a set of policy rules that dictate that keys should only be released if they have not expired and if the key requester's authentication credentials are valid.

In a typical scenario, an application requests a key from key server 22. When requesting the key, the application provides authentication credentials to the key server 20. The key server 20 provides the authentication credentials to authentication server 24. Authentication server 24 verifies the authentication credentials and provides the results of the verification operation to the key server over communications network 14. If the key requester is successfully authenticated and if the key server determines that the expiration period has not yet expired, the key server can satisfy the key request by providing the requested key to the application over a secure path in network 14 (e.g., over a secure sockets layer link). Other authentication techniques and key request arrangements may be used if desired.

Figure 2:
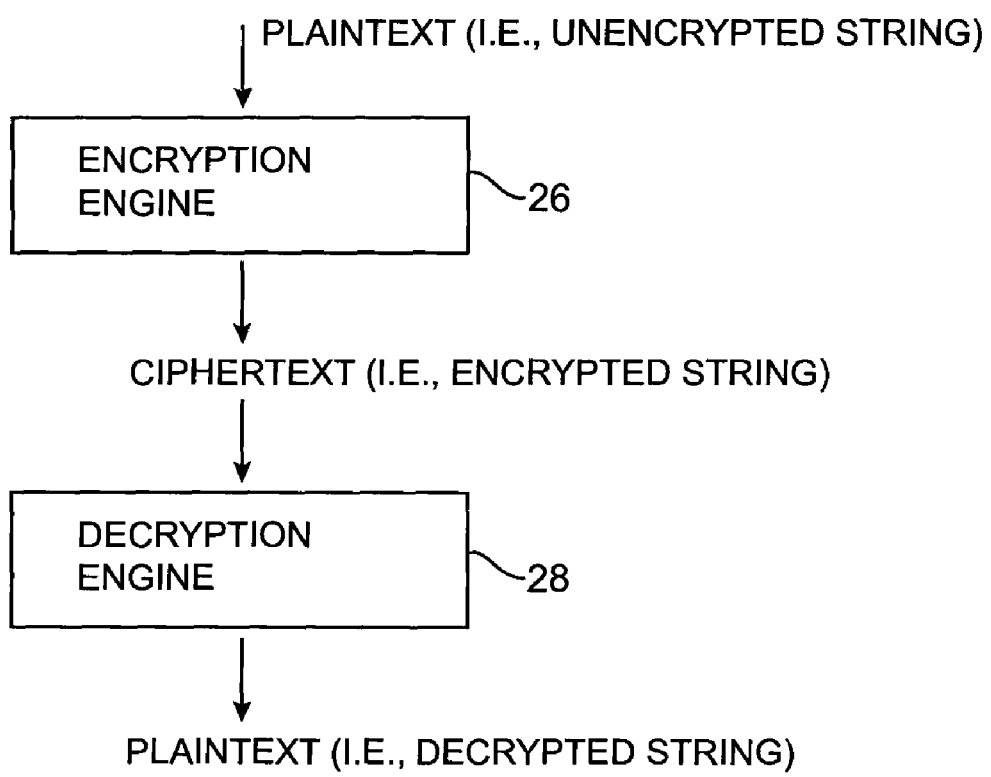
FIG. 2 is a diagram showing how encryption and decryption engines preserve the format of a string in accordance with an embodiment of the present invention.

The data handled by the applications 16 and databases 18 of system 10 is represented digitally. The data includes strings of characters (i.e., names, addresses, account numbers, etc.). As shown in FIG. 2, during encryption operations, an encryption engine 26 encrypts unencrypted strings of characters (sometimes referred to as plaintext) into encrypted strings of characters (sometimes referred to as ciphertext). During decryption operations, a decryption engine 28 decrypts encrypted strings of characters to form unencrypted strings of characters.

The data strings that are handled in a typical data processing system have defined formats. For example, an identification number may be made up of three letters followed by ten digits. The encryption and decryption engines of the present invention are able to encrypt and decrypt strings without changing a string's format (i.e., so that a plaintext identification number made up of three letters followed by ten digits would be encrypted to form corresponding ciphertext make up of three letters and ten digits). The ability to preserve the format of a data string greatly simplifies system operations and allows systems with legacy applications to be provided with cryptographic capabilities that would not be possible using conventional techniques.

Conventional encryption algorithms can alter the format of a string during encryption, so that it becomes difficult or impossible to use the encrypted version of the string. For example, it may be impossible to store a conventionally-encrypted credit card number in a database table that has been designed to handle strings that contain only digits.

In accordance with the present invention, data stings can be encrypted and decrypted while preserving the format of the strings. Consider, as an example, the encryption and decryption of credit card numbers. Credit card numbers generally have between 13 and 18 digits. The format for a particular valid credit card number might require that the credit card number have 16 digits. This type of credit card number will be described as an example.

In a 16-digit credit card number, the digits are typically organized in four groups of four each, separated by three spaces. During a format-preserving encryption operation, an unencrypted credit card number such as "4408 0412 3456 7890" may be transformed into credit-card-formatted ciphertext such as "4417 1234 5678 9114" and during decryption, the ciphertext "4417 1234 5678 9114" may be transformed back into the unencrypted credit card number "4408 0412 3456 7890".

The value of a valid sixteenth digit in a credit card number is formed by performing a checksum operation on the first 15 digits using the so-called Luhn algorithm. Any single-digit error in the credit card number and most adjacent digit transpositions in the credit card number will alter the checksum value, so that data entry errors can be identified.

During encryption operations, the encryption engine 26 can compute a new checksum value using the first 15 digits of the ciphertext. The new checksum digit can be used in the ciphertext or, if desired, policy information such as a validity period may be embedded within the checksum digit by adding an appropriate validity period index value to the new checksum value. When a validity period is embedded within a checksum digit, the resulting modified checksum value will generally no longer represent a valid checksum for the string. However, applications in system 10 will be able to retrieve the validity period information from the checksum digit and will be able to use the extracted validity period information in obtaining a decryption key from key server 20 (FIG. 1).

This type of embedding operation may be used to store any suitable information within encrypted data. The use of credit card numbers and, more particularly, the use of validity period information that has been embedded within the checksum digits of credit card numbers are described herein as examples.

Because encryption and decryption engines 26 and 28 of FIG. 2 can preserve a desired format for a string during encryption and decryption operations, sensitive data can be secured without requiring entire files to be encrypted.

The encryption and decryption engines 26 and 28 preferably use index mappings to relate possible character values in a given string position to corresponding index values in an index. By mapping string characters to and from a corresponding index, the encryption and decryption engines 26 and 28 are able to perform encryption and decryption while preserving string formatting.

In a typical scenario, an index mapping may be formed using a table having two columns and a number of rows. The first column of the mapping corresponds to the potential character values in a given string position (i.e., the range of legal values for characters in that position). The second column of the mapping corresponds to an associated index. Each row in the mapping defines an association between a character value and a corresponding index value.

Consider, as an example, a situation in which the string being encrypted has first, fifth, sixth, and seventh string characters that are digits and second, third, and fourth characters that are uppercase letters. In this situation, the possible character values in the first, fifth, sixth, and seventh character positions within the plaintext version of the string might range from 0 to 9 (i.e., the first character in the string may be any digit from 0 through 9, the fifth character in the string may be any digit from 0 to 9, etc.). The possible character values in the second, third, and fourth positions in the string range from A to Z (i.e., the second character in the unencrypted version of the string may be any uppercase letter in the alphabet from A to Z, the third character in the unencrypted version of the string may be any uppercase letter from A through Z, etc.).

The index mapping in this type of situation may map the ten possible digit values for the first, fifth, sixth, and seventh string characters into ten corresponding index values (0 . . . 9).

For the second, third, and fourth character positions, 26 possible uppercase letter values (A . . . Z) may be mapped to 26 corresponding index values (0 . . . 25).

In a typical string, not all characters have the same range of potential character values. If there are two ranges of potential character values, two index mappings may be used, each of which maps a different set of possible character values to a different set of index values. If there are three ranges of potential character values within the string, three index mappings may be used. For example, a first index mapping may relate a digit character to a first index, a second index mapping may relate a uppercase letter character to a second index, and a third index mapping may relate an alphanumeric character to a third index. In strings that contain a larger number of different character types, more index mappings may be used.

In general, a string contains a number of characters N. The potential character values in the string are related to corresponding index values using index mappings. An index mapping is created for each character. The indexes used to represent each character may have any suitable size. For example, an index containing 52 index values may be associated with string characters with character values that span both the uppercase and lowercase letters. Because not all of the characters typically have the same range of potential character values, there are generally at least two different index mappings used to map character values in the string to corresponding index values. In a string with N characters, N index mappings are used, up to N of which may be different index mappings.

Figure 3:
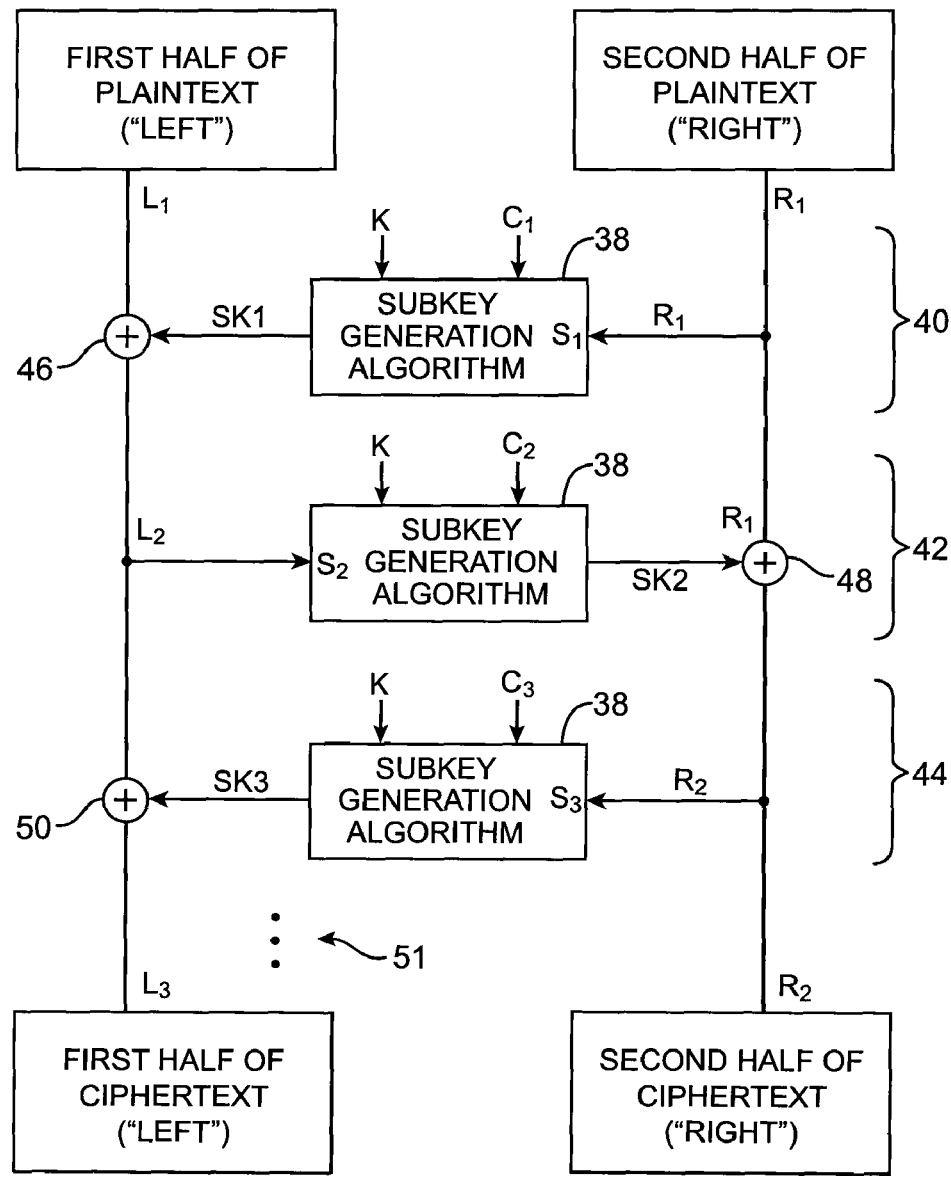
FIG. 3 is a diagram of an illustrative format-preserving block cipher that may be used during data encryption and decryption in accordance with an embodiment of the present invention.

Any suitable cryptographic formulation may be used for the format-preserving encryption and decryption engines 26 and 28, provided that the cryptographic strength of the encryption algorithm is sufficiently strong. With one suitable approach, encryption engine 26 and decryption engine 28 use a cryptographic algorithm based on the well known Luby-Rackoff construction. The Luby-Rackoff construction is a method of using pseudo-random functions to produce a pseudo-random permutation (also sometimes referred to as a block cipher). A diagram showing how encryption engine 26 and decryption engine 28 may be implemented using the Luby-Rackoff construction is shown in FIG. 3. During encryption operations, an unencrypted string is divided into two portions. The unencrypted string may be divided into two portions using any suitable scheme. For example, the string may be divided into odd and even portions by selecting alternating characters from the string for the odd portion and for the even portion. With another suitable approach, the unencrypted string is divided into two portions by splitting the string into left and right halves.

In FIG. 3, the first half of the unencrypted string is labeled "$L_1$" and the second half of the unencrypted string is labeled "$R_1$". During encryption operations with encryption engine 26, the unencrypted string halves $L_1$ and $R_1$ are processed to form corresponding encrypted string halves $L_3$ and $R_2$. During decryption operations with decryption engine 28, processing flows from the bottom of FIG. 3 towards the top, so that encrypted string halves $L_3$ and $R_2$ are decrypted to produce unencrypted halves $L_1$ and $R_1$. Processing occurs in three rounds 40, 42, and 44. During encryption, the operations of round 40 are performed first, the operations of round 42 are performed second, and the operations of round 44 are performed third. During decryption, the operations of round 44 are performed first, the operations of round 42 are performed second, and the operations of round 40 are performed third.

As indicated by dots 51 in FIG. 3, the operations of FIG. 3 may, if desired, be implemented using four or more rounds. For example, eight rounds of a block cipher may be performed.

The block cipher structure of FIG. 3 encrypts (or decrypts) a string of a particular known size to produce an output string of the same size. During encryption, plaintext is converted to ciphertext (i.e., the block cipher of FIG. 3 is operated from top to bottom). During decryption, ciphertext is converted to plaintext (i.e., the block cipher of FIG. 3 is operated from bottom to top).

The block cipher uses a subkey generation algorithm 38. The subkey generation algorithm 38 has three inputs: a key K, a constant C ($C_1$ for round 40, $C_2$ for round 42, and $C_3$ for round 44), and a string S ($S_1=R_1$ for round 40, $S_2=L_2$ for round 42, and $S_3=R_2$ for round 44).

The subkey generation algorithm 38 may be a function H' that is based on a cryptographic hash function H and that takes as an input S, C, and K. With one suitable approach, the subkey generation algorithm H' is given by equation 1.

$$H'=H(S|C|K) \tag{1}$$

In equation 1, the symbol "|" represents the concatenation function. The cryptographic hash function H is preferably chosen so that the subkey generation algorithm has a suitable cryptographic strength. Illustrative cryptographic hash functions that can be used for hash function H include the SHA1 hash function and the AES algorithm used as a hash function.

The value of the key K is the same for rounds 40, 42, and 44. The value of the constant C is different for each round. With one suitable arrangement, the constant $C_1$ that is used in round 40 is equal to 1, the constant $C_2$ that is used in round 42 is 2, and the constant $C_3$ that is used in round 44 is 3. The value of S varies in each round. In round 40, $S_1$ is equal to the first half of the unencrypted string $R_1$. In round 42, $S_2$ is equal to the $L_2$. In round 44, $S_3$ is equal to $R_2$.

In round 40, the output of the subkey generation algorithm is subkey SK1, as shown in equation 2.

$$SK1=H(S_1|C_1|K) \tag{2}$$

In round 42, the output of the subkey generation algorithm is subkey SK2, as shown in equation 3.

$$SK2=H(S_2|C_2|K) \tag{3}$$

In round 44, the output of the subkey generation algorithm is subkey SK3, as shown in equation 4.

$$SK3=H(S_3|C_3|K) \tag{4}$$

Equations 1-4 involve the use of a cryptographic hash function for the subkey generation algorithm. If desired, the subkey generation algorithm may be implemented using a cryptographic message authentication code (MAC) function. A cryptographic message authentication code function is a keyed hash function. Using a cryptographic message authentication code function, equation 1 would become H'=MACF(S|C,K), where MACF is the message authentication code function. An example of a message authentication code function is CMAC (cipher-based MAC), which is a block-cipher-based message authentication code function. The cryptographic message authentication code function AES-CMAC is a CMAC function based on the 128-bit advanced encryption standard (AES).

A format-preserving combining operation (labeled "+" in FIG. 3) is used to combine the subkeys SK1, SK2, and SK3 with respective string portions.

During encryption operations, format-preserving combining operation 46 combines SK1 with string $L_1$ to produce string $L_2$. During decryption operations, format-preserving combining operation 46 combines SK1 with string $L_2$ to produce string $L_1$. Format-preserving combining operation 48 combines SK2 with string $R_1$ to produce string $R_2$ during encryption operations and combines SK2 with string $R_2$ to produce string $R_1$ during decryption operations. Format-preserving combining operation 50 is used to process subkey SK3. During encryption, format-preserving combining operation 50 combines SK3 with string $L_2$ to produce string $L_3$. During decryption, format-preserving combining operation 50 combines SK3 with string $L_3$ to produce string $L_2$.

The format-preserving combining operation + preserves the format of the strings $L_1$, $L_2$, $L_3$, $R_1$, and $R_2$ as they are combined with the subkeys SK1, SK2, and SK3. For example, the string $L_2$ that is produced by combining string $L_1$ and subkey SK1 has the same format as the string $L_1$.

The format-preserving combining operation + may be based on any suitable mathematical combining operation. For example, the function + may be addition mod x or the function + may be multiplication mod x, where x is an integer of an appropriate size (i.e., $x=y^z$, where z is equal to the length of the string S, and where y is equal to the number of possible character values for each character in the string S). If, as an example, the string S contains 16 digits (each digit having one of 10 possible values from 0 to 9), x would be $10^{16}$. If the string S contains three uppercase letters (each uppercase letter having one of 26 possible values from A to Z), x would be $26^3$. These are merely illustrative examples. The format-preserving combining function + may be any reversible logical or arithmetic operation that preserves the format of its string input when combined with the subkey.

Figure 4:
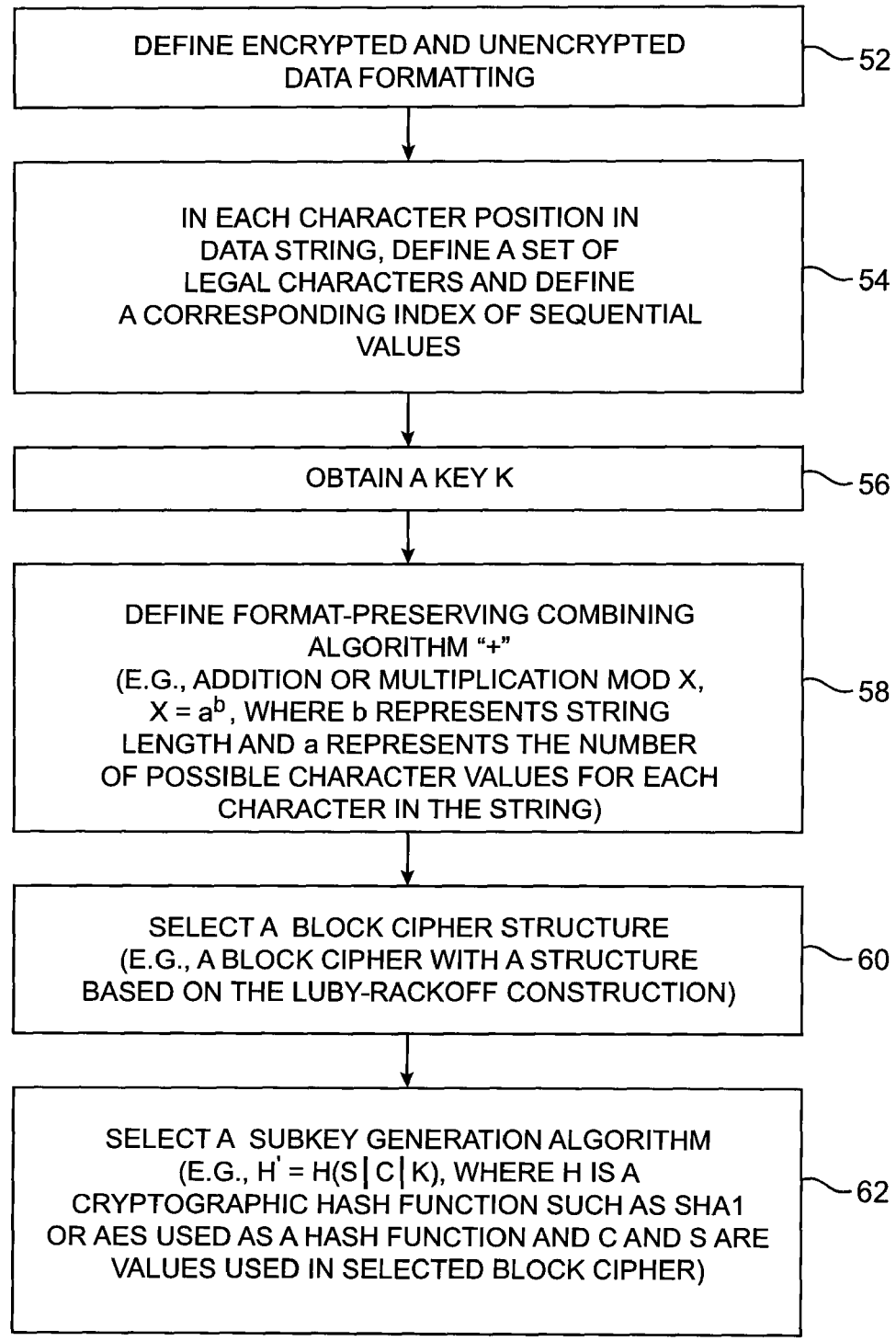
FIG. 4 is a flow chart of illustrative steps that may be used in setting up format-preserving encryption and decryption engines for use in a data processing system of the type shown in FIG. 1 in accordance with an embodiment of the present invention.

Illustrative steps involved in setting up the encryption engine 26 and decryption engine 28 are shown in FIG. 4. At step 52, the desired formatting to be used for the encrypted and decrypted strings is defined.

For example, unencrypted strings may be social security numbers that follow the format ddd-dd-dddd, where d is a digit from 0 to 9. The encryption engine 26 may produce corresponding encrypted strings with the identical format.

As another example, the string format may be dddd dddd dddd dddc, where d is a digit from 0 to 9 and where c is a checksum digit (a digit from 0 to 9). The block cipher may be applied to the leading 15 digits of the credit card number and a checksum value may be recomputed from the encrypted version of the leading 15 digits using the Luhn algorithm. Validity period information may be embedded into the checksum digit by adding a validity period index to the recomputed checksum value. The index may, as an example, specify that an index value of 1 corresponds to the year 2006, an index value of 2 corresponds to the year 2007, an index value of 3 corresponds to the year 2008, etc. If the recomputed checksum is 3 (as an example), and the validity period for the encryption operation is 2006, the index value of 1 (corresponding to year 2006) may be added to the checksum value of 3 to produce a checksum digit of 4 for the ciphertext. In this situation, the final version of the encrypted string has the form dddd dddd dddd dddc, where the value of c is 4. The overall encryption process implemented by the encryption engine 26 maintains the digit format of the string, because both the unencrypted and encrypted versions of the string contain 16 digits.

The inclusion of additional constraints on the format of the encrypted string may be necessary to ensure that the encrypted strings are fully compliant with legacy applications. During step 52, a user decides which of these ancillary constraints are to be included in the definition of the required format for the string.

At step 54, for each character in the string, an index mapping is created by defining a set of legal character values and a corresponding index of sequential values that is associated with the legal characters values. For example, if the legal characters for a particular character position in a string include the 10 digits (0 . . . 9) and the 26 lowercase letters (a . . . z), a suitable indexing scheme associates digits 0 through 9 with index values 1 through 10 and associates letters a through z with index values 11-36. In this index mapping, the index values that are created are all adjacent. Because there are no gaps in the indices, index value 10 is adjacent to index value 11 (in the present example). If the string contains more than one type of character, there will be more than one index mapping associated with the characters in the string.

At step 56, a value for key K is obtained. The value of K may be obtained, for example, by generating K from a root secret and other information using a key generation algorithm in key server 20.

At step 58, the format-preserving combining operation "+" is defined. As described in connection with FIG. 3, the format-preserving combining operation may be addition modulo x, multiplication modulo x, or any other suitable logical or arithmetic operation that preserves the format of the string when combining the string with a subkey and that is reversible.

At step 60, a block cipher structure is selected for the encryption engine 26 and decryption engine 28. The block cipher structure may, for example, by a Luby-Rackoff construction of the type described in connection with FIG. 3. Other suitable block cipher structures may be used if desired.

At step 62, a subkey generation algorithm is selected. Suitable subkey generation algorithms include those based on cryptographic hash functions such the SHA1 hash function and AES algorithm used as a hash function. Suitable subkey generation algorithms also include those built on cryptographic message authentication code functions such as AES-CMAC.

After performing the setup steps of FIG. 4, the encryption engine 26 and decryption engine 28 can be implemented in system 10 and sensitive data can be secured.

Figure 5:
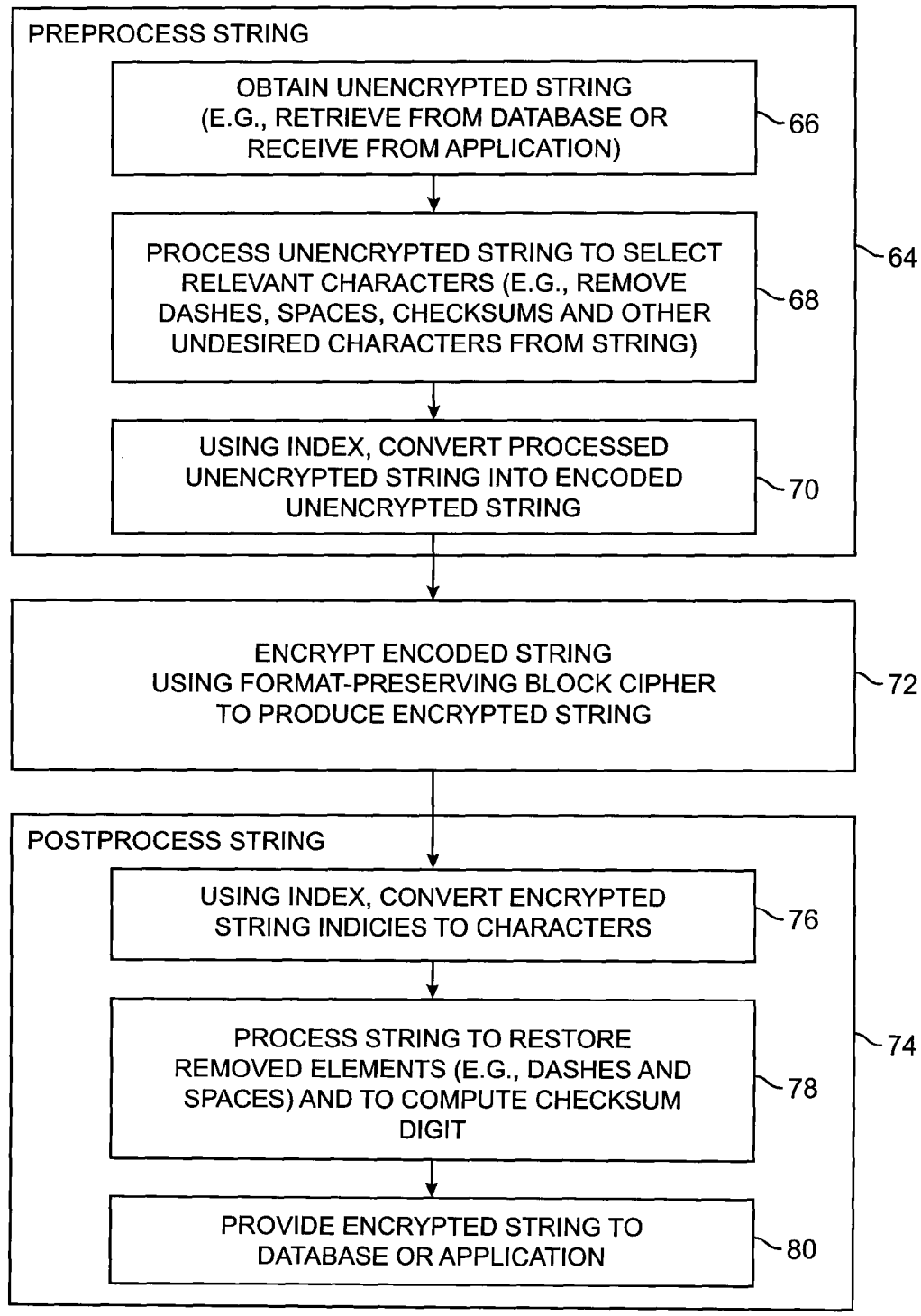
FIG. 5 is a flow chart of illustrative steps involved in using a format-preserving encryption engine to encrypt a data string in accordance with an embodiment of the present invention.
Figure 6:
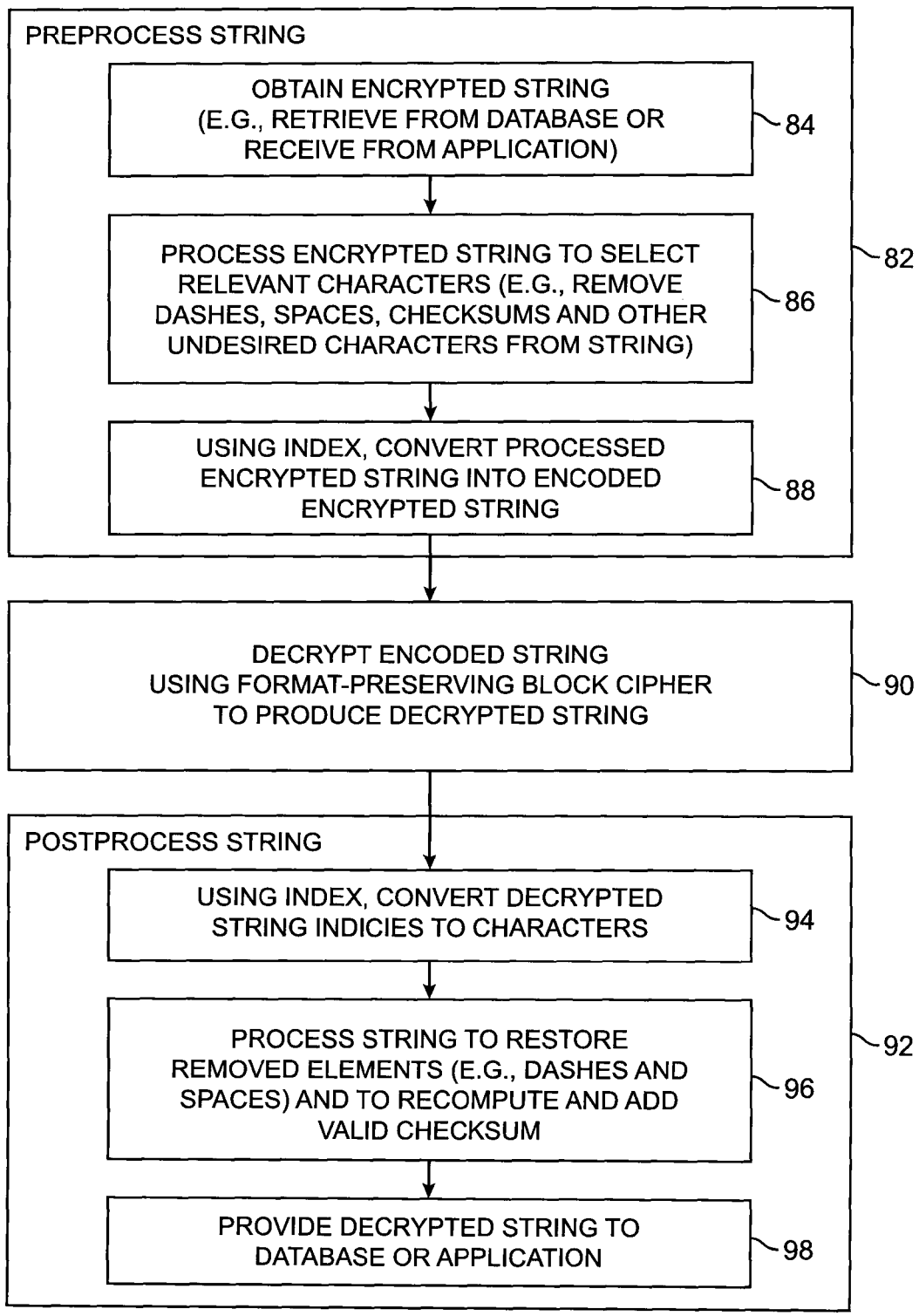
FIG. 6 is a flow chart of illustrative steps involved in using a format-preserving decryption engine to decrypt a data string in accordance with an embodiment of the present invention.

Illustrative steps involved in using the encryption engine 26 and decryption engine 28 when processing strings of data in system 10 are shown in FIGS. 5 and 6. As described in connection with FIGS. 1 and 2, the encryption engine 26 and decryption engine 28 may be called by an application or may be part of an application 16 that is running on data processing system 10. The data strings that are encrypted and decrypted may be strings that are retrieved from and stored in fields in a database 18 or may be strings that are passed between applications 16 (e.g., applications 16 that are running on the same computing equipment 12 or that are communicating remotely over a communications network 14).

The flow chart of FIG. 5 shows steps involved in encrypting a data string.

As shown in FIG. 5, the data string is preprocessed at step 64, encrypted at step 72, and postprocessed at step 74.

At step 66, the encryption engine obtains the unencrypted string. The string may be retrieved from a database 18 or received from an application 16.

At step 68, the string is processed to identify relevant characters. During step 68, dashes spaces, checksums, and other undesired characters can be removed from the string and the relevant characters in the string can be retained.

For example, if the string is a social security number that contains nine digits separated by two dashes, the string can be processed to remove the dashes. Although the dashes could be left in the string, there is no purpose in encrypting a dash character in the unencrypted string to produce a corresponding dash character in the encrypted string (as would be required to preserve the format of the entire string).

As another example, if the string being processed is a credit card number containing 16 digits and three spaces, the spaces can be removed. The checksum portion of the 16 digit credit card can be ignored by extracting the 15 leading digits of the credit card number as the relevant characters to be processed further.

At step 70, the encryption engine 26 uses the index mappings that were created during step 54 of FIG. 4 to convert the processed string (i.e., the string from which the irrelevant characters have been removed) into an encoded unencrypted string. For example, consider a license plate number in which the first, fifth, sixth, and seventh character positions contain digits (i.e., numbers from 0 through 9) and the second, third, and fourth character positions contain uppercase letters. An index mapping may be used to convert the character values in the first, fifth, sixth, and seventh character positions into corresponding index values ranging from 0 through 9. Another index mapping may be used to convert the character values in the second, third, and fourth character positions into corresponding index values ranging from 0 through 25. The index values used in each index mapping may be sequential. Once the characters have been encoded using the sequential index values, processing can continue at step 72.

At step 72, the encryption engine 26 encrypts the encoded string using the format-preserving block cipher that was established during the operations of FIG. 4. For example, the encryption engine 26 can perform the Luby-Rackoff encryption operations described in connection with FIG. 3. During step 72, the subkey generation algorithm that was selected at step 62 of FIG. 4 and the format-preserving combining algorithm + that was defined at step 58 of FIG. 4 are used to transform the unencrypted encoded string into an encrypted encoded string.

At step 76, the same index mappings that were used during the encoding operations of step 70 are used to convert the index values of the encrypted string back into characters (i.e., characters in the legal set of character values that were defined for each character position at step 54). Decoding the encoded version of the string using the index mappings returns the string to its original character set.

At step 78, the decoded encrypted string is processed to restore elements such as dashes and spaces that were removed at step 68. When replacing a checksum value, a new valid checksum value can be computed from the encrypted version of the string and validity period information or other suitable information can be embedded within the checksum digit (e.g., by adding a validity period index to the new valid checksum value to produce a checksum digit for the decoded encrypted string). The decoded encrypted string is ciphertext that corresponds to the plaintext unencrypted string that was obtained at step 66. If desired, the entire string can be encrypted. With this type of arrangement, the checksum removal operation of step 68 and the checksum digit computation operation of step 78 can be omitted.

By processing the string at step 78, the extraneous elements of the string that were removed at step 68 are inserted back into the string. Because the extraneous elements are reinserted into the string and because a format-preserving block cipher was used in step 72, the encrypted string that is produced will have the same format as the original unencrypted string. This allows the encrypted string to be used by applications 16 and databases 18 that require that the original string's format be used.

At step 80, the encrypted string is provided to an application 16 or database 18. Legacy applications and databases that require a specific string format may be able to accept the encrypted string.

Illustrative steps involved in using decryption engine 28 to decrypt a string that has been encrypted using the process of FIG. 5 are shown in FIG. 6. The decryption engine 28 may be invoked by an application 16 or may be part of an application 16 that is running on data processing system 10. The data string that is being decrypted in the process of FIG. 6 may be an encrypted string that has been retrieved from a database 18 or may be a string that has been retrieved from an application.

As shown in FIG. 6, the encrypted data string is preprocessed at step 82, is decrypted at step 90, and postprocessed at step 92.

At step 84, the decryption engine obtains the encrypted string. The encrypted string may be retrieved from a database 18 or received from an application 16.

At step 86, the encrypted string is processed to identify relevant characters. During step 86, dashes spaces, checksums, and other extraneous elements can be removed from the string. The relevant characters in the string are retained. The process of removing extraneous characters during step 86 is the same as that used during the processing of the unencrypted string that was performed during step 68 of FIG. 5.

If the string being decrypted is a social security number that contains nine digits separated by two dashes, the encrypted string can be processed to remove the dashes.

As another example, if the string being processed during step 86 is a credit card number containing 16 digits and three spaces, the spaces can be removed prior to decryption. The checksum digit of the 16 digit credit card can be ignored by extracting the 15 leading digits of the encrypted credit card number as the relevant characters to be decrypted. If information is embedded in the checksum digit (e.g., validity period information), the checksum digit may be processed to extract this information during step 86.

At step 88, the decryption engine 26 uses the index mappings that were defined at step 54 of FIG. 4 and that were used during the encryption operations of FIG. 5 to convert each of the characters of the processed encrypted string (i.e., the encrypted string from which the extraneous characters have been removed) into an encoded encrypted string. If, as an example, the legal set of characters associated with the first character of the encrypted string is defined as the set of 10 digits, a 10 digit index may be used to encode the first character of the encrypted string. If the legal set of characters associated with the second character of the encrypted string is defined as the set of 26 uppercase letters, a 26-digit index may be used to encode the second character of the encrypted string. During step 88, each character of the string is converted to a corresponding index value using an appropriate index mapping.

At step 90, the encoded version of the encrypted string is decrypted. The decryption engine 28 decrypts the string using the format-preserving block cipher that was established during the operations of FIG. 4. For example, the decryption engine 26 can perform the Luby-Rackoff decryption operations described in connection with FIG. 3. During step 90, the subkey generation algorithm that was selected at step 62 of FIG. 4 and the format-preserving combining algorithm + that was defined at step 58 of FIG. 4 are used to transform the encrypted encoded string into a decrypted encoded string.

At step 94, the index mappings that were used during the encoding operations of step 88 are used to convert the index values of the decrypted string back into their associated characters (i.e., characters in the legal set of character values that were defined for each character position at step 54). This returns the decrypted string to its original character set. In strings that contain more than one different type of character, multiple different index mappings are used.

At step 96, the decoded decrypted string is processed to restore elements such as dashes, spaces, and checksum values that were removed at step 88. When replacing a checksum value, a new valid checksum value may be computed from the decrypted version of the string. This ensures that the decrypted version of the string will be returned to its original valid state.

During the string processing operations of step 96, the extraneous elements of the string that were removed at step 88 are inserted back into the string. This restores the string to its original unencrypted state (i.e., the state of the string when obtained at step 66 of FIG. 5).

At step 98, the decrypted string is provided to an application 16 or database 18.

By incorporating format-preserving encryption and decryption engines 26 and 28 into data processing system 10, legacy applications and databases and other applications and databases can be provided with cryptographic capabilities without disrupting their normal operation.

The key K that is used by encryption and decryption engines 26 and 28 may be produced using any suitable technique. For example, key K may be supplied to key server 20 manually and may be distributed to encryption and decryption engines 26 and 28 in satisfaction of valid key requests. With one particularly suitable arrangement, key K is derived mathematically from a secret. The secret, which is sometimes referred to as a root secret, may be maintained at key server 20. The root secret may be supplied to key server 20 manually or may be produced using a pseudo-random number generator.

To ensure that keys are only distributed to authorized applications 16, it may be advantageous to mathematically compute each key K from policy information 22 (FIG. 1). As an example, key K may be computed by key server 20 using equation 5.

$$K = f(\text{RSECRET}, \text{IDEN}) \quad (5)$$

In equation 5, the parameter IDEN is an identifier, the parameter RSECRET is a root secret, and the function f is a one-way function such as a hash function. An example of a hash function that may be used for function f is the SHA1 hash function. If desired, other hash functions and one-way functions may be used for function f.

The identifier IDEN may include information that identifies an individual, a group, a policy, or an application. As an example, the identifier may be based on the name of an individual, the name of an organization, the name of a group, or any other suitable user name. The identifier may also be based on the name of a policy (e.g., "PCI" indicating that cryptographic operations should be performed in accordance with payment card industry standards) or may be based on the name of an application. When an application requests key K from key server 20, the key server 20 may use all or part of the value of IDEN in determining whether the key requester is authorized to receive K. If the key requester is authorized, the function of equation 5 may be used to generate K.

To support version-based functions in system 10, it may be desirable to allow identities and their associated keys K to expire. Identity and key expiration may be implemented by requiring that a validity period be included in each identity IDEN. The validity period indicates the dates on which the key K is valid. Validity periods can be expressed in terms of absolute dates, abbreviated dates, version numbers that relate to valid date ranges or key versions, etc.

One suitable format for the validity period is an expiration date. For example, a validity period for IDEN may be made up of a year of expiration (e.g., 2007), may be made up of a week of expiration (e.g., week number 45), may be made up of a month and year of expiration (e.g., 03/2007 or 03/07), etc. Validity periods may also be constructed using a date range (e.g., 2006-2007) during which key K is valid. With one suitable arrangement for use when encrypting and decrypting credit cards, the validity period in an identity IDEN may be a credit card expiration date (e.g., 05/08).

The credit card expiration date or other such information (e.g., a record locator, cardholder name, etc.) may be combined with information that labels the identity IDEN as being associated with credit cards and the payment card industry (PCI). The value of IDEN might be formed, for example, by combining the strings "Joe Smith" (the name of a holder of a credit card), "PCI" (indicating the payment card industry), and a credit card expiration date to form (as an example) a value for IDEN of "JOE_SMITH_PCI_05/08."

Figure 7A:
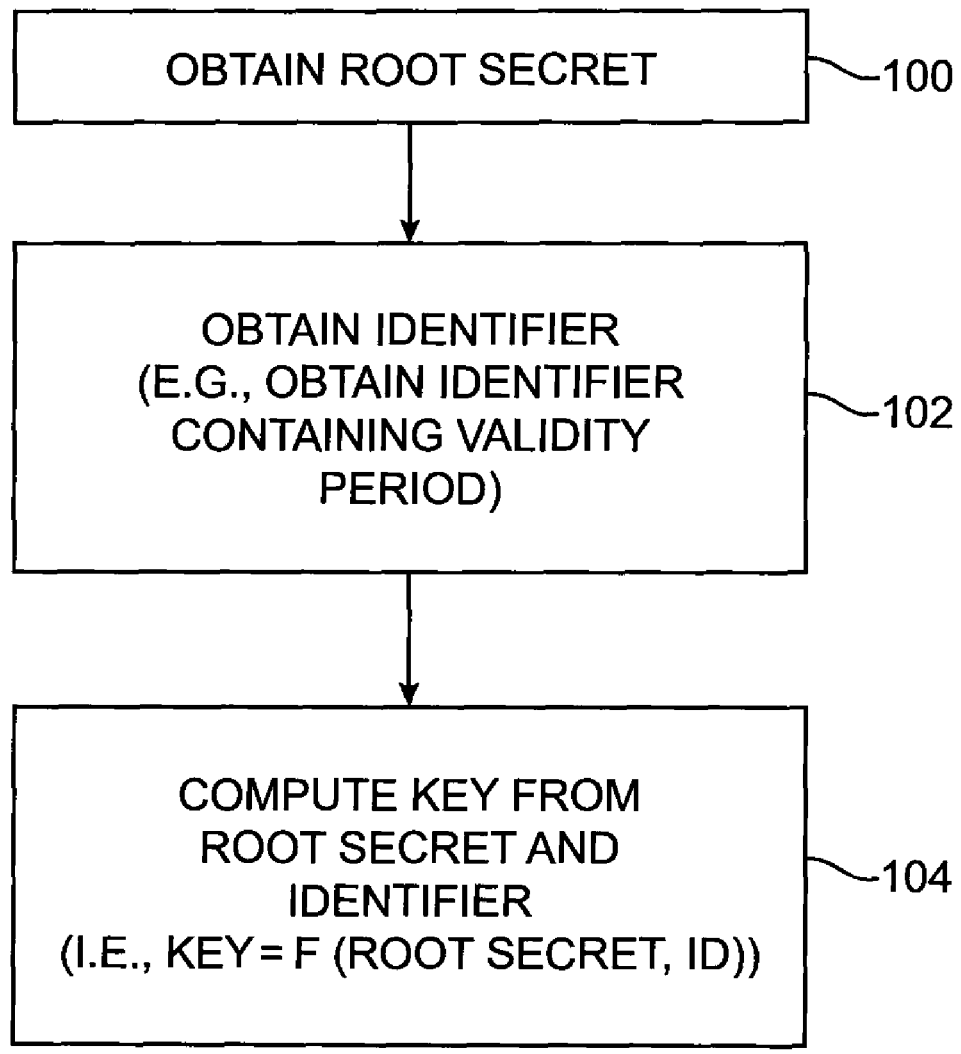
FIG. 7A is a flow chart of illustrative steps involved in generating a key that is based on an identifier in accordance with an embodiment of the present invention.

Illustrative steps involved in forming a key K using equation 5 are shown in FIG. 7A.

At step 100, key server 20 obtains the parameter RSECRET (e.g., using a pseudorandom number generator operating at key server 20, by retrieving RSECRET from a cache at key server 20, etc.).

At step 102, the key server 20 obtains the parameter IDEN. The parameter IDEN may be provided to key server 20 as part of a key request (e.g., in a single transmission requesting a key or in a series of related transmissions requesting a key). Information such as a user identity (e.g., a username or part of a username, a group identity, etc.), validity period (e.g., an expiration date, a valid date range, a version number, or a combination of such validity period information), and industry/key type (e.g., "PCI" for the payment card industry) may be included in the value of the IDEN string. If desired, components of the IDEN string may be represented using multiple strings or additional information may be included in the IDEN string.

At step 104, key server 20 may use function f of equation 5 (e.g., a SHA1 hash function or other one-way function) to compute K from the known values of the root secret RSECRET and the identifier IDEN.

Keys may be generated using the operations of FIG. 7A at any suitable time. For example, key server 20 may generate a key K whenever a valid key request is received. If desired, key server 20 may maintain a key cache in which previously generated keys are stored. Use of a key cache may reduce the processing burden on key server 20.

Figure 7B:
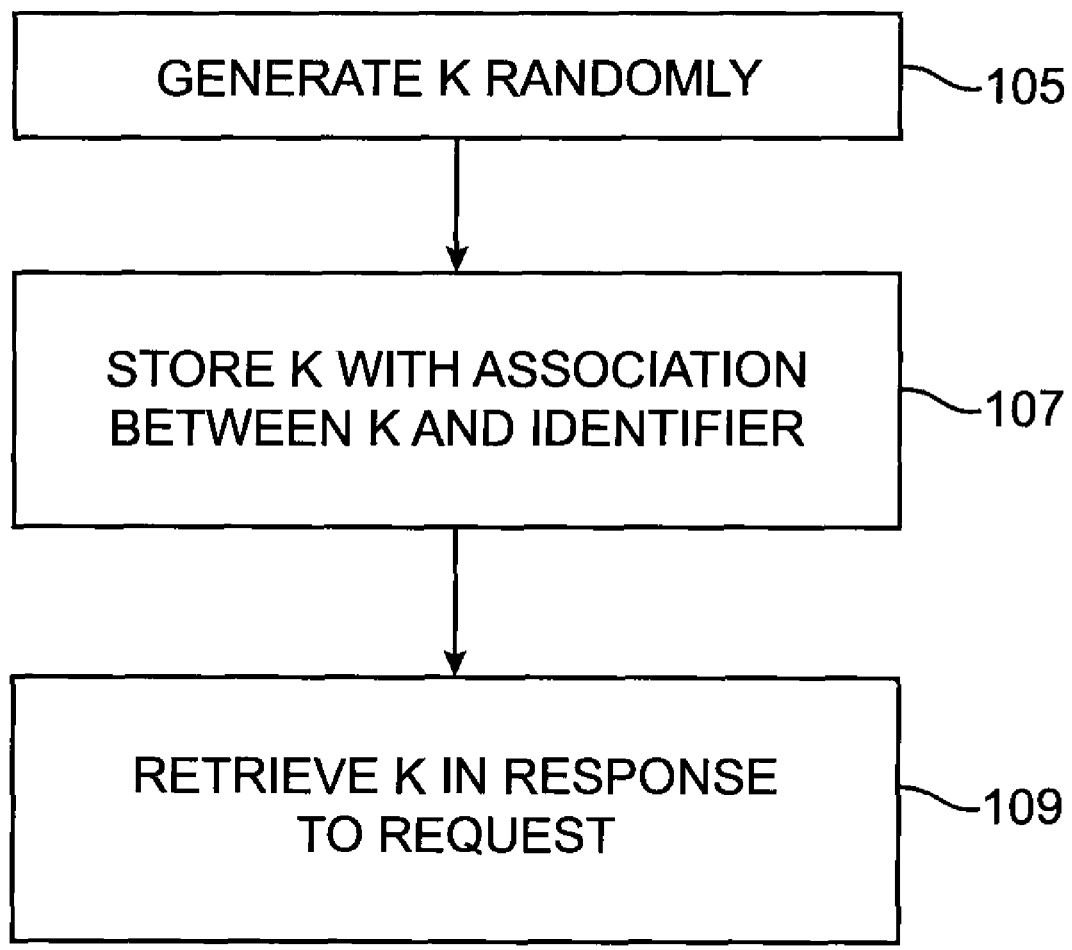
FIG. 7B is a flow chart of illustrative steps involved in generating a key and storing the generated key with an association between the stored key and an identifier in accordance with an embodiment of the present invention.

A flow chart of illustrative steps involved in generating key K using an approach in which generated key K is persistently stored is shown in FIG. 7B. With the approach of FIG. 7B, key K is generated randomly at step 105. For example, key K may be generated using a pseudorandom number generator at key server 20 when a key is requested in a key request containing an identifier IDEN.

At step 107, the key K is stored in persistent storage (e.g., a key cache maintained at key server 20). Key server 20 also stores an association between the key K that has been generated and the value of identifier IDEN from the key request. The association may be provided by making an entry in a database that contains the key and the related identifier IDEN (as an example). At a later time, when key K is requested, key server 20 can retrieve the correct key K from storage to satisfy the request using the value of the identifier IDEN that is provided in the key (step 109). The approach of FIG. 7B therefore allows the key generator 20 to obtain the key K by generating the key K randomly (if no key value has been cached) or by retrieving a previously stored version of key K using the identity value IDEN.

Key server 20 also preferably maintains policy information 22 (FIG. 1). Policy information 22 includes policy rules that may be used in determining which key requests should be granted and which key requests should be denied. An example of a policy rule is a rule that requires that a key requester authenticate successfully as part of a PCI LDAP (Lightweight Directory Access Protocol) group whenever the parameter IDEN includes the industry type "PCI." As another example, a policy rule might specify that key requests should only be satisfied if made at date that falls within the validity period specified in the IDEN parameter. Key server 20 may maintain a clock or may otherwise obtain trustworthy external information on the current date. External information such as this may be used by key server 20 in evaluating whether the policy rules have been satisfied for a particular key request. In a typical scenario, the policy rules at key server 20 will specify multiple criteria that must be satisfied (e.g., proper authentication of a given type must be performed, a validity period restriction must be satisfied, etc.).

Figure 9:
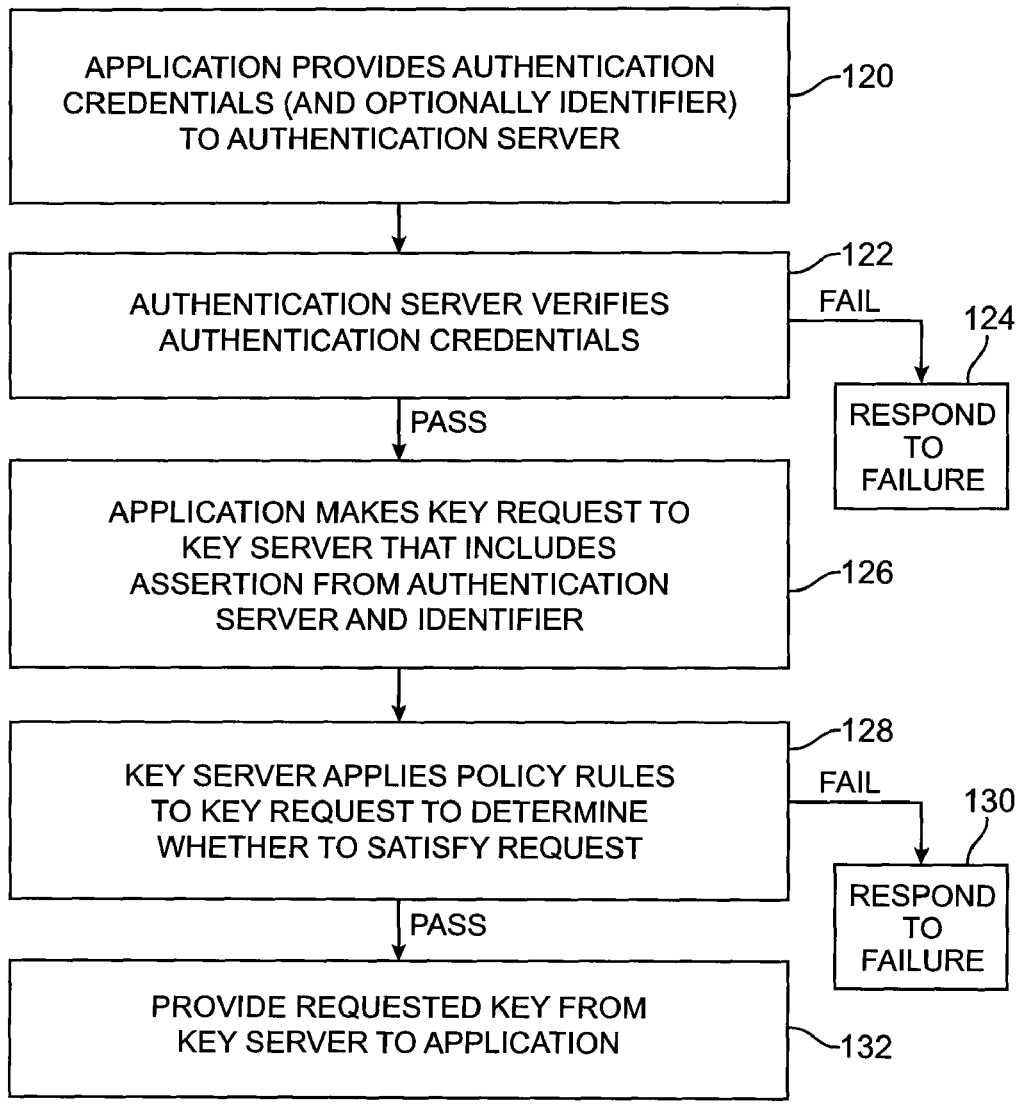
FIG. 9 is a flow chart of illustrative steps involved in requesting and obtaining a key from a key server in accordance with another embodiment of the present invention.
Figure 10:
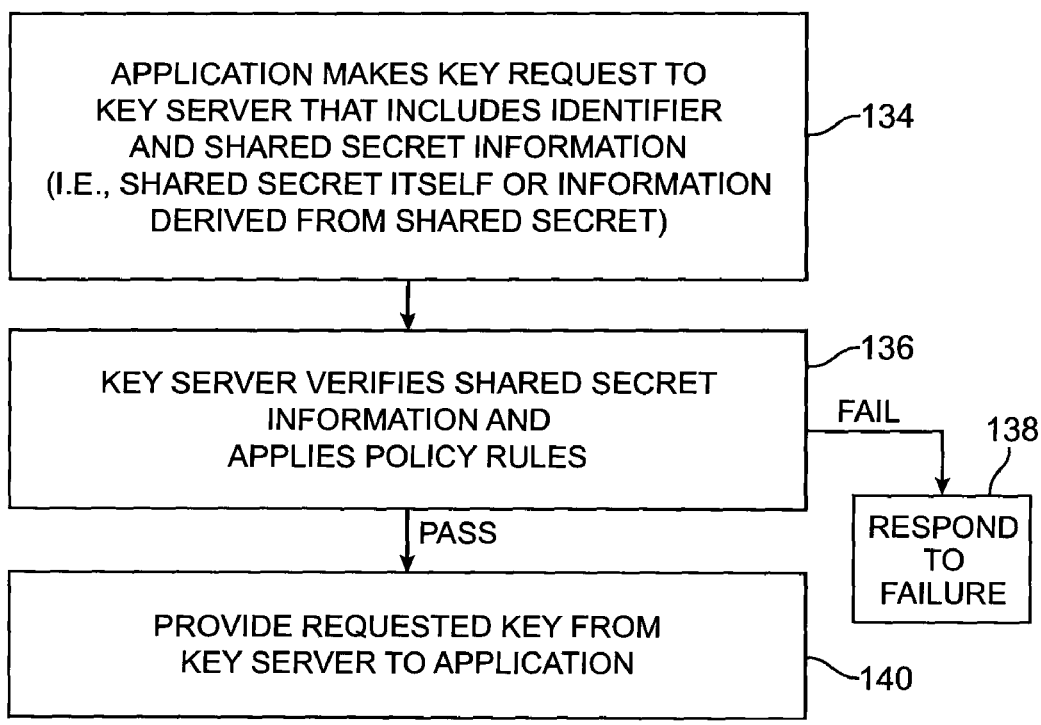
FIG. 10 is a flow chart of illustrative steps involved in requesting and obtaining a key from a key server in accordance with yet another embodiment of the present invention.

In some situations, authentication server 24 is used in authenticating key requesters. In other situations, key server 20 may perform authentication. Key requests may be made by encryption engine 26 when a copy of a key K is needed to perform an encryption operation or by decryption engine 28 when a copy of key K is needed to perform a decryption operation. In general, any suitable technique may be used to process key requests. Flow charts presenting three illustrative ways in which key requests for key K may be handled in system 10 are shown in FIGS. 8, 9, and 10.

Figure 8:
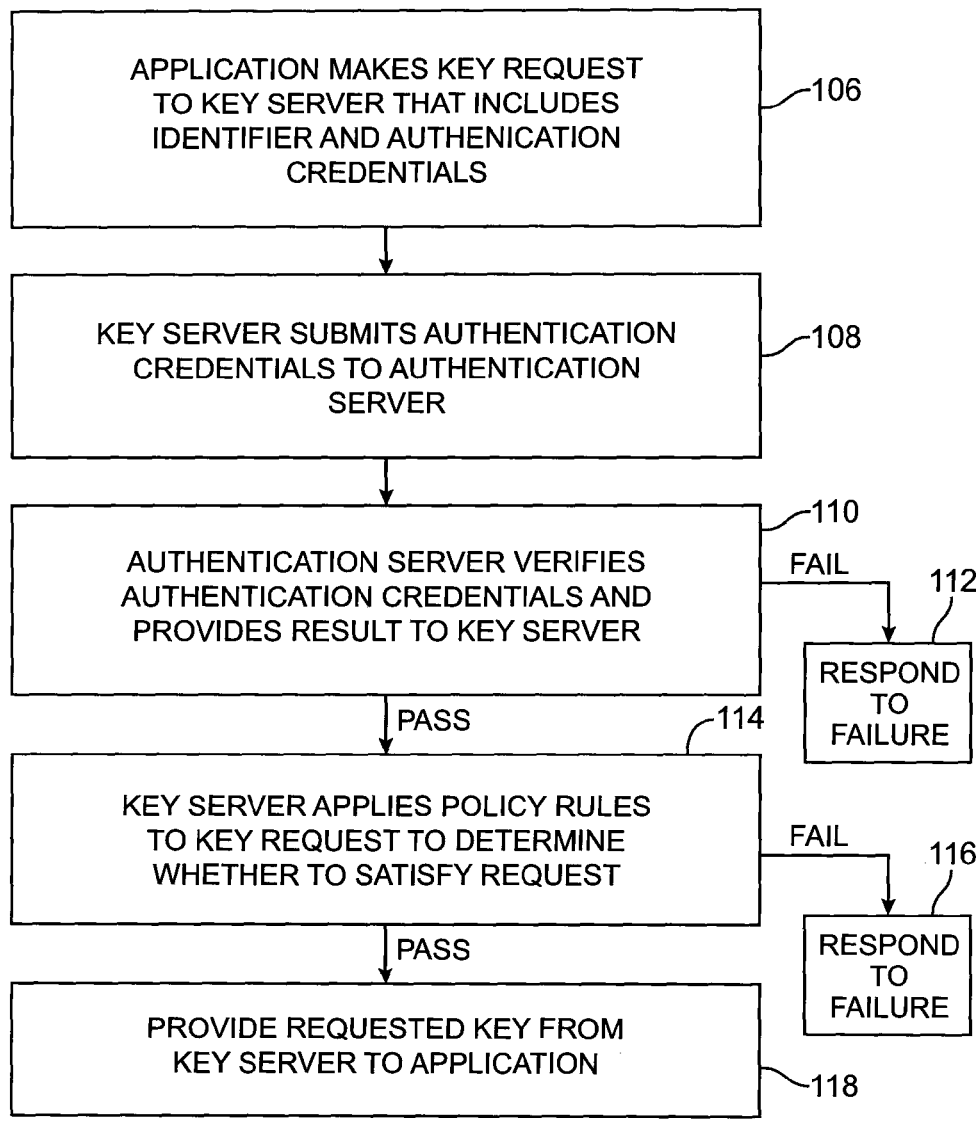
FIG. 8 is a flow chart of illustrative steps involved in requesting and obtaining a key from a key server in accordance with an embodiment of the present invention.

In the example of FIG. 8, an encryption engine or decryption engine associated with an application 16 makes a key request to key server 20 at step 106. Key requests such as the key request of step 106 may be made in a single transmission over network 14 between the computing equipment 12 on which the requesting application resides or may be made in multiple associated transmissions. The key request may include authentication credentials and an identifier such as the identifier parameter IDEN described in connection with FIGS. 7A and 7B. The identifier that is associated with the key request may include information such as a validity period (e.g., a credit card expiration date), user name, etc. Different types of keys may require different levels of authentication. The authentication credentials that are provided as part of the key request are preferably provided in a form that is suitable for the type of key being requested. One example of authentication credentials is a userID and password. Biometric authentication credentials may also be used (as an example).

At step 108, key server 20 forwards the authentication credentials that have been received from the key requester to authentication server 24 over communications network 14.

At step 110, authentication server 24 verifies the authentication credentials. For example, if the authentication credentials include a userID and password, authentication server 24 may compare the userID and password to a list of stored valid userIDs and passwords.

If the authentication server 24 determines that the authentication credentials are not valid, the authentication process fails. A suitable response to this failure may be generated at step 112. For example, authentication server 24 can notify key server 20 that the authentication credentials are not valid and can generate suitable alert messages for entities in system 10. Other suitable actions include generating an error message that prompts key server 20 and/or the key requester to resubmit the credentials (e.g., to avoid the possibility that the authentication failure was due to mistyped authentication credentials).

If the authentication server 24 determines that the authentication credentials are valid, the authentication server 24 notifies the key server 20 accordingly. In a typical scenario, the authentication server provides the key server 20 with an "assertion" indicating that the credentials are valid. The assertion may include information on group membership and roles and rights for the authenticated party.

At step 114, key server 20 applies policy rules 22 to the key request. Information such as the identity information IDEN, the authentication results from authentication server 24 (e.g., the assertion), and external information such as the current date may be used by the key server 20 in enforcing the policy rules.

As an example, identity information, authentication results, and external information may be used in determining which policy rules should be applied. Certain policy rules may be applied when IDEN indicates that the key requester is making a "PCI" key request. Such rules may, as an example, require a particular level of authentication. Certain policy rules may also be applied when a key request is made on particular times and dates (e.g., more stringent authentication may be required for evening and weekend key requests). Certain policy rules may apply to particular groups of users, etc.

In addition to determining which policy rules should be applied, key server 20 may also use identity information, authentication results, and external information in determining whether the applicable policy rules have been satisfied. For example, during step 114, key server 20 may determine whether the key request includes valid validity period information (e.g., whether an expiration period has expired). Key server 20 may also check to make sure that appropriate valid authentication results have been received from authentication server 24, may check the key requester's membership in a directory group, etc.

If the criteria set forth in the applicable policy rules are not satisfied, the key request fails and appropriate error notifications may be generated or other actions may be taken at step 116.

If the applicable policy rules are satisfied, key server 20 may generate a key K to satisfy the key request at step 118. The key K may be generated using operations of the type shown in FIG. 7A or may be generated or retrieved using operations of the type shown in FIG. 7B. The key K may then be supplied to the key requester over a secure path in communications network 14.

In this example, key server 20 applies the applicable policy rules to the key request following successful verification of the authentication credentials by authentication server 24. If desired, the policy rules can be applied between steps 106 and 108. In this type of scenario, the key server need not submit the authentication credentials to the authentication server if the policy rules are not satisfied (e.g., if validity period information indicates that an expiration date has passed).

Another illustrative technique that may be used by an encryption engine or decryption engine associated with an application to obtain key K is shown in FIG. 9. With this technique, authentication is performed using authentication server 24 before the key request is made to key server 20.

At step 120, an application 16 that desires a key K provides authentication credentials to authentication server 24 for verification. If desired, the application may also provide an identifier (e.g., parameter IDEN) to authentication server 24, which may use this information to determine what type of assertion to provide to the application following successful verification of the authentication credentials.

At step 122, authentication server 24 verifies the authentication credentials. If the authentication credentials are not valid, an appropriate response may be made at step 124 (e.g., by providing the application with another chance to provide valid credentials, by issuing an alert, etc.).

If the authentication credentials are determined to be valid, the authentication server provides the application with an assertion over communications network 14. The assertion may be, for example, a Kerberos ticket.

At step 126, the application uses the assertion that has been received from the authentication server in making a key request to key server 20. The key request may include the assertion from authentication server 24 and an identifier (e.g., parameter IDEN).

At step 128, the key server applies policy rules 22 to the key request to determine whether the key request should be satisfied. Key server 20 may use identity information (e.g., parameter IDEN, which may include a validity period), authentication results (e.g., the assertion), and external information (e.g., the current date) in determining which policy rules should be applied to the key request. The key server may also use this information in determining whether the applicable policy rules have been satisfied. As an example, key server 20 may determine whether the key request includes valid validity period information during step 128 and may check to determine whether the assertion is valid and sufficient to satisfy the policy rules.

If the applicable policy rules are not satisfied, the key server 20 may request that the application issue a new request or may take other suitable actions in response to the failure (step 130).

If the key server determines that the applicable key access policy rules have been satisfied, the key server may retrieve key K from cache or may generate an appropriate key K, as discussed in connection with FIGS. 7A and 7B. At step 132, the key K may be provided from key server 20 to the requesting application over communications network 14.

With the approach of FIG. 10, authentication operations are performed by key server 20, so authentication server 24 need not be used.

At step 134, an application that needs key K makes a key request to key server 20. The key request may include an identifier (e.g., parameter IDEN) and shared secret information. The shared secret information may be, for example, a shared secret (i.e., a secret known by the application and by the key server) or shared secret information that is derived from the shared secret (e.g., by hashing the shared secret with an identifier such as parameter IDEN).

At step 136, the key server verifies the shared secret information. The key server may, as an example, compare the shared secret information from the key request to previously generated and stored shared secret information or to shared secret information that is generated in real time based on the received identity (e.g., IDEN). If the shared secret information is valid, the key server can determine which key access policy rules are to be applied to the key request (e.g., using external information such as the current date, using identity information IDEN, etc.). After determining which policy rules to use, key server 20 applies the appropriate policy rules to the key request.

If the criteria set forth in the policy rules are not satisfied, the key request fails and appropriate actions can be taken at step 138.

If the policy rules are satisfied, the key server can retrieve key K from cache or may generate key K in real time (e.g., using the operations of FIGS. 7A and 7B). The requested key may then be provided to the key requester over communications network 12 (step 140).

One of the potential advantages of using key server 20 is that it helps to avoid problems that might otherwise arise when storing keys in local cache on computing equipment 12. If keys are only maintained in local storage, it may be difficult to recreate a key when needed to resurrect a server that has crashed. By using key server 20, keys can be regenerated as needed at the key server.

Systems such as system 10 of FIG. 1 may use validity periods to control when keys are valid. A first application may encrypt plaintext using a cryptographic key that is based on a given validity period. The resulting ciphertext may then be stored in a database and retrieved by a second application or may be provided directly to the second application over network 14. The second application must obtain a copy of key K to decrypt the ciphertext. The key K must be generated using the given validity period. If an incorrect validity period is used in generating K, the value of K will be incorrect and the second application will not be able to use that value of K to decrypt the ciphertext.

Figure 11:
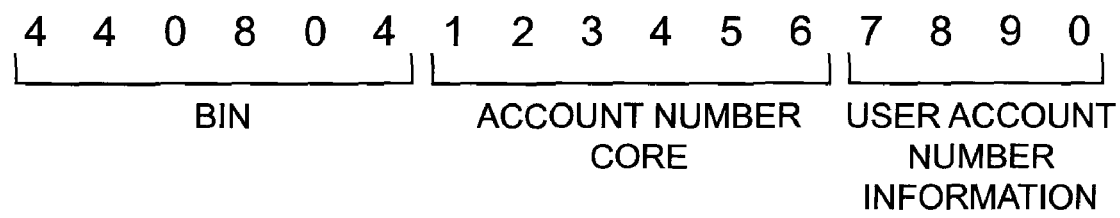
FIG. 11 is a diagram showing how different parts of a data item can be divided into different plaintext parts and selectively encrypted in accordance with an embodiment of the present invention.

It may be desirable to selectively grant applications access to different parts of a data string. Consider the example of a credit card number. As shown in FIG. 11, a sixteen digit credit card number may include three parts. The leading six digits of the credit card number are sometimes referred to as the bank identification number (BIN). The next six digits of the credit card number are sometimes referred to as the account number core and form part of the credit card holder's account number. The last four digits of the credit card number are sometimes referred to as user account number information and are used with the account number core to identify a credit card holder's account.

Different parties may be entitled to access different parts of the credit card number. Some parties may only need access to the BIN. Other parties may require access to the entire credit card number. As a result, it may be desirable to selectively grant access to different portions of the credit card number to different parties.

Selective access may be provided to different portions of a data item using format-preserving cryptography. Users (individuals, organizations, applications, etc.) that require access to one part of a data item, may be provided with appropriate cryptographic key(s) to access that part of the data item, whereas users that require access to another portion of the data item may be provided with appropriate key(s) to access that portion. Using this type of arrangement, a first user might, for example, be provided with access to an entire social security number, whereas a second user might only be provided with access to the last four digits of a social security number. As another example, a first user might be provided with access to the first or last four digits of a credit card number, whereas a second user might be provided with access to the entire credit card number. In scenarios with three or more users, each user may likewise be provided with access to different portions of a social security number, credit card number, or other data item.

Figure 12:
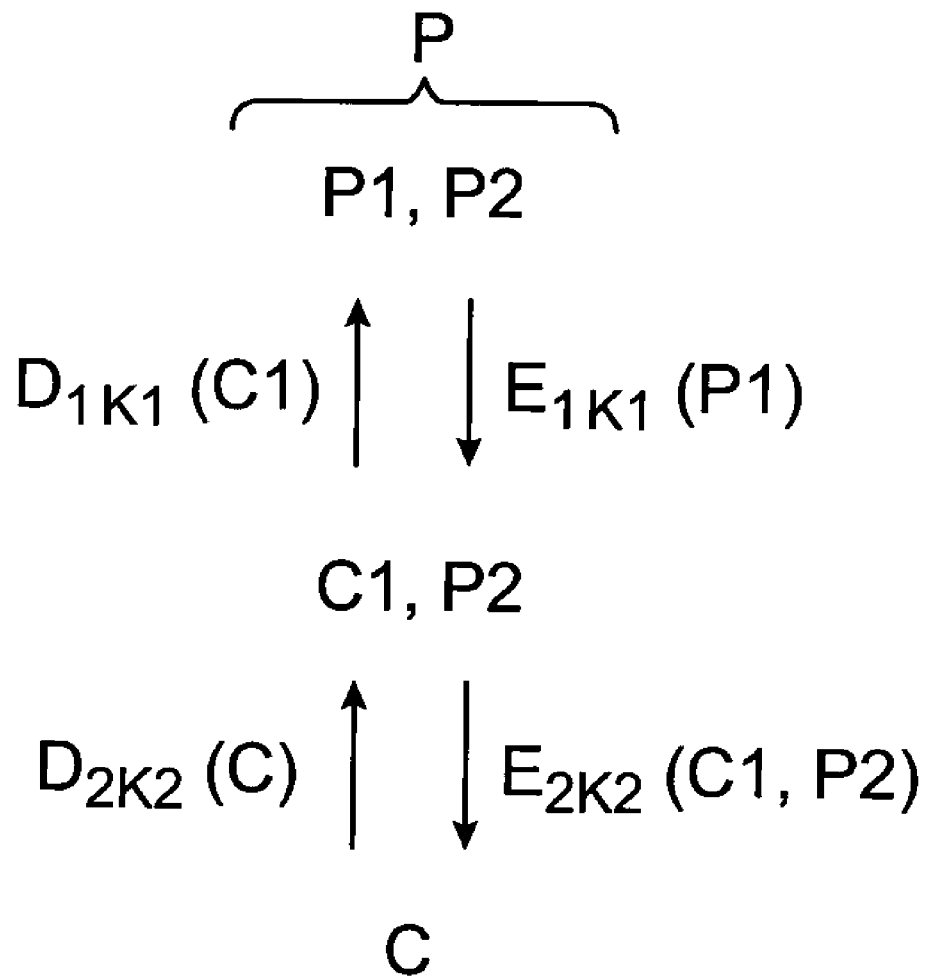
FIG. 12 is a diagram showing how multiple keys may be used to provide selective access to different parts of a data item in accordance with an embodiment of the present invention.

Consider, as an example, a plaintext data item P. As shown in FIG. 12, plaintext P may be made up of two parts: plaintext P1 and plaintext P2. As an example, plaintext P might be a credit card number and plaintext portion P2 might be the last four digits of the credit card number. In this type of example, plaintext P1 would represent the leading twelve digits of the credit card number.

Using a first format-preserving cryptographic algorithm (e.g., a block-cipher-based algorithm of the type described in connection with FIG. 3) and a first cryptographic key K1, plaintext P1 can be converted into ciphertext C1 and ciphertext C1 can be converted into plaintext P1, as shown in FIG. 12. A second format-preserving cryptographic algorithm (e.g., a block-cipher-based algorithm of the type described in connection with FIG. 3) and a second cryptographic key K2 may be used to convert ciphertext C1 and plaintext portion P2 into ciphertext C and may be used to convert ciphertext C into ciphertext portion C1 and plaintext portion P2.

During a first set of encryption operations, format-preserving encryption algorithm $E_1$ and cryptographic key K1 are used to encrypt plaintext P1 to produce corresponding ciphertext C1, whereas plaintext portion P2 is left unencrypted. During a second set of encryption operations, format-preserving encryption algorithm $E_2$ and cryptographic key K2 are used to encrypt ciphertext C1 and plaintext P2 to produce ciphertext C. Encryption algorithm $E_1$ is a format-preserving encryption algorithm that maps plaintext P1 to ciphertext C1 that is in the same format as plaintext P1. Encryption algorithm $E_2$ is a format-preserving encryption algorithm that maps input (C1, P2) to ciphertext C that is in the same format as (C1, P2). In this context, input (C1, P2) serves as "plaintext" corresponding to output ciphertext C.

When decrypting ciphertext C, a decryption algorithm $D_2$ (corresponding to encryption algorithm $E_2$) may perform decryption operations with key K2 to produce ciphertext C1 and plaintext part P2. Decryption algorithm $D_2$ is a format-preserving decryption algorithm, so output (C1, P2) is in the same format as input C. Following decryption operations with decryption algorithm $D_2$, decryption algorithm $D_1$ (corresponding to encryption algorithm $E_1$) may perform decryption operations on C1 using key K1 to produce plaintext P1. Decryption algorithm $D_1$ is a format-preserving decryption algorithm, so output P1 is in the same format as input C1.

A first user (USER1) may be provided with key K1 and key K2. A second user (USER2) may be provided with only key K2. Because USER1 has both keys, USER1 can decrypt C with decryption function $D_2$ and key K2 to produce C1 and P2 and can decrypt C1 with decryption function $D_1$ and K1 to produce P1. Plaintext P1 and plaintext P2 can be assembled to produce plaintext P, so USER1 can access all of P. Because USER2 has only key K2, USER2 can only use decryption function $D_2$ to decrypt C and produce ciphertext C1 and plaintext P2. USER2 is therefore able to access only plaintext P2, not plaintext P1.

Figure 13:
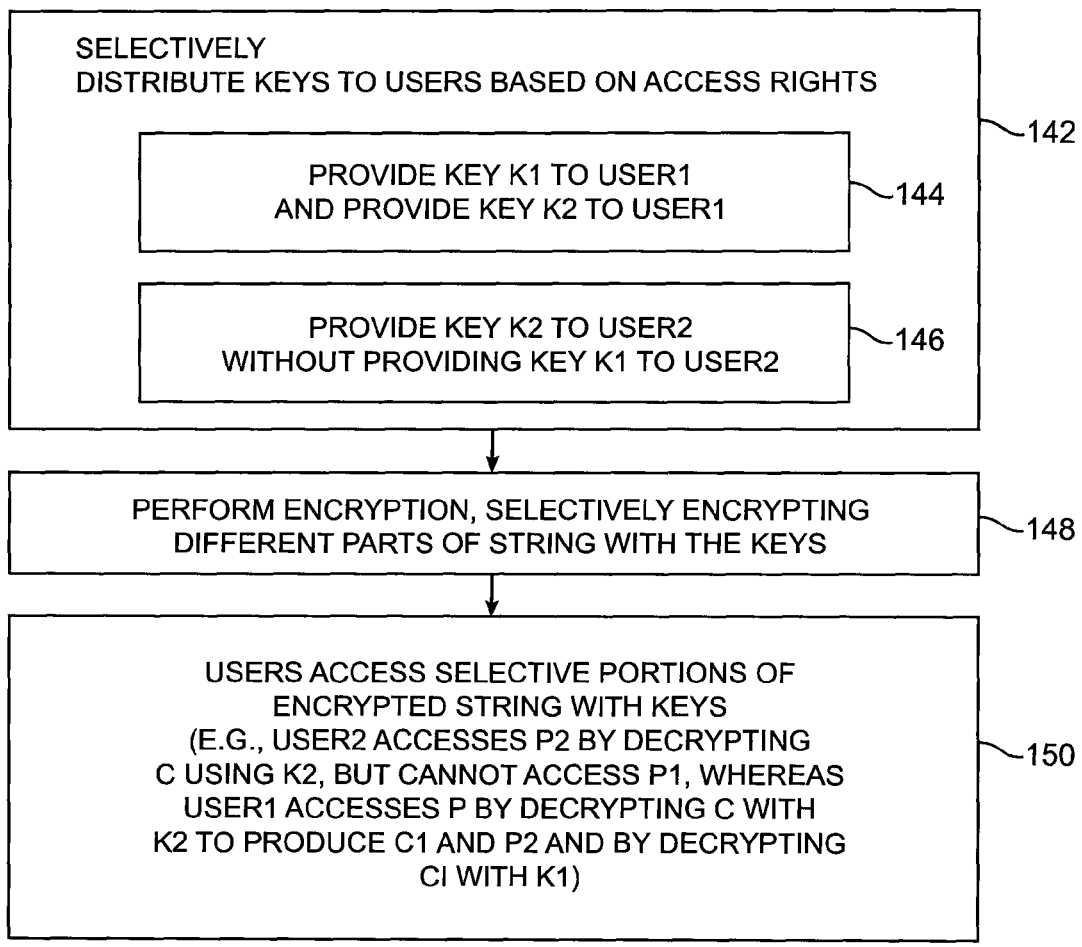
FIG. 13 is a flow chart of illustrative steps involved in using multiple keys to provide selective access to different part of a data item in accordance with an embodiment of the present invention.

Illustrative steps involved in using format-preserving encryption and decryption algorithms to selectively provide access to different parts of a data item are shown in FIG. 13. At step 142, key server 20 or other suitable entity may be used to selectively distribute keys to users (i.e., to software applications or parts of applications that are associated with individuals, organizations, etc.). Different keys may be distributed to different users depending on the level of access that it is desired to grant each user. For example, at step 144, first and second keys such as keys K1 and K2 of FIG. 12 may be provided to a first user USER1, as described in connection with FIG. 12. At step 146, second key K2 may be provided to a second user USER2, as described in connection with FIG. 12.

At step 148, keys K1 and K2 are used in encrypting different portions of the data item P. For example, key K1 may be used to encrypt plaintext part P1 of P to produce corresponding ciphertext C1, whereas key K2 may be used in encrypting both C1 and plaintext part P2 of P to produce corresponding ciphertext C. The selective encryption operations of step 148 may be performed at any suitable time (e.g., before, after, or during the key distribution operations of step 142). Each encryption step may use a unique encryption algorithm such as encryption algorithms $E_1$ and $E_2$ of FIG. 12. Encryption algorithm $E_1$, which may be used to encrypt plaintext P1, may be a format-preserving encryption algorithm that is suitable for encrypting the last four digits of a credit card number (as an example). Encryption algorithm $E_2$ may be a format-preserving encryption algorithm that is suitable for encrypting a 16 digit credit card number (as an example).

During step 150, format-preserving decryption algorithms (e.g., decryption algorithm $D_2$ corresponding to encryption algorithm $E_2$ and decryption algorithm $D_1$ corresponding to encryption algorithm $E_1$) may be used to reverse the encryption operations of step 142. In particular, decryption algorithm $D_2$ and key K2 may be used by USER2 to decrypt C to produce ciphertext C1 and plaintext P2, thereby providing USER2 with access to plaintext part P2 of plaintext P, but not access to plaintext part P1 of plaintext P. Because USER1 obtained both keys K1 and K2 during step 142, USER1 is able to decrypt C with $D_2$ using key K2 to produce C1 and plaintext P2 and is able to decrypt C1 with $D_1$ and key K1 to produce P1. This allows USER1 to access all parts of P (i.e., both P1 and P2 in this example).

If desired, more than two levels of encryption may be provided. For example, plaintext P may be divided into three or more portions Pi, three or more format-preserving encryption algorithms Ei and three or more corresponding keys Ki may be used to encrypt each portion in a successive operation as described in connection with FIGS. 12 and 13. Following selective key distribution to three or more users, a corresponding number (i.e., three or more) matching decryption algorithms Di may be used to provide these users with selective access to the different plaintext portions Pi. The arrangement of FIGS. 12 and 13 in which a string P was divided into two portions and in which two users were provided with selective access to different portions of the string is merely illustrative.

During string preprocessing operations (e.g., the encoding operations of step 70 of FIG. 5 and step 88 of FIG. 6), it may be desirable to convert characters into unique binary values. These unique binary values may then be encrypted (as described in connection with the format-preserving encryption operations of step 72 of FIG. 5) or decrypted (as described in connection with the format-preserving decryption operations of step 90 of FIG. 6).

Figure 14:
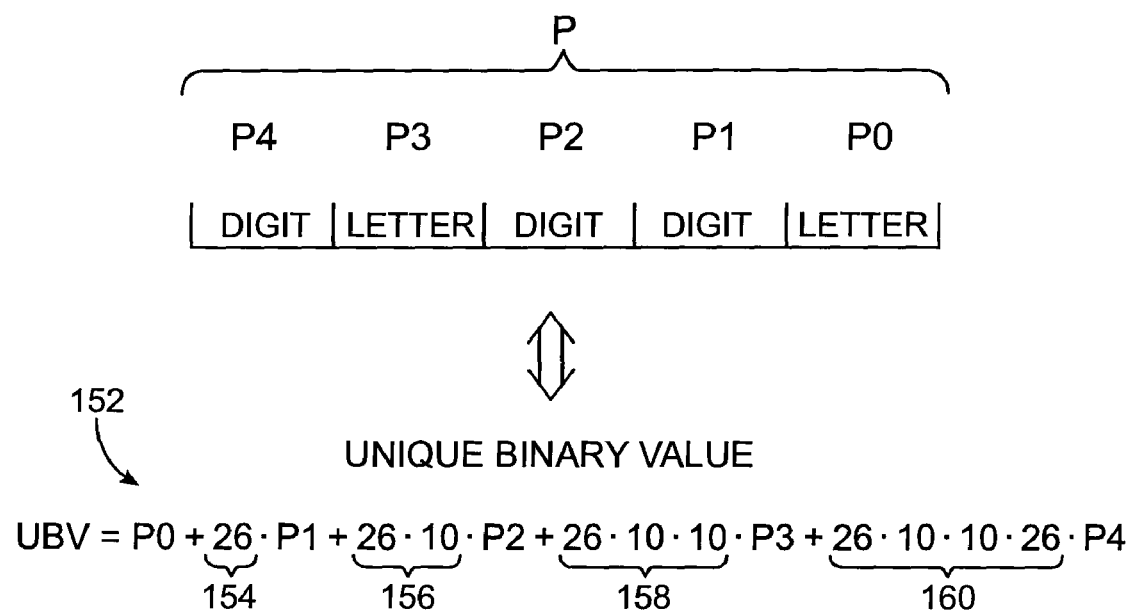
FIG. 14 is a diagram showing how a string may be represented as a unique binary value in accordance with an embodiment of the present invention.

One type of technique that may be used when encoding strings as unique binary values is illustrated in FIG. 14. In the example of FIG. 14, an unencoded (plaintext) string P is converted into a unique binary value UBV. String P (in this example) is made up of characters P4, P3, P2, P1, and P0. Characters P4, P2, and P1 are digits and may therefore have any value between 0 and 9 (i.e., 0 1, 2, 3, . . . 9). Characters P3 and P0 are letters and may have any letter value (i.e., A, B, C, D, . . . Z). Each digit character may have one of ten values and each letter character may have one of 26 values. To uniquely convert string P to binary, a formula such as formula 152 may be used.

In formula 152, P0 represents a numeric value for letter P0. In a typical indexing scheme for letters, "A" corresponds to 0, "B" corresponds to 1, . . . and "Z" corresponds to 25, so if P0 is the letter "B," the numeric value for P0 in equation 152 will be 1. P1 is a digit. In a typical encoding scheme for digits, 0 corresponds to 0, 1 corresponds to 1, . . . and 9 corresponds to 9, so if P1 is the digit "3," the value of P1 will be 3. Using an encoding scheme of this type, character P2 will have a numeric value of 0 to 9, P3 will have a numeric value of 0 to 25, and P4 will have a numeric value of 0 to 9.

As shown in formula 152, the numeric values of the characters P0, P1, P2, P3, and P4 are multiplied by respective coefficients 154, 156, 158, and 160 (the coefficient of P0 is "1"). The value of each multiplicative coefficient in formula 152 represents the number of possible values of the previous character. For example, in formula 152, the numeric value of character P1 is multiplied by coefficient 154. The value of coefficient 154 is 26, because P0 (the character that is just prior to character P1 in string P) may have any one of 26 possible values. Coefficient 156 of numeric value P2 has a value of 260, because the combination of preceding characters P0 and P1 could have any of 260 possible values. Likewise, the value of coefficient 158 of P3 is 2600 because there are 2600 possible combinations of numeric values for preceding characters P0, P1, and P2 and the value of coefficient 160 of P4 is 67600 because there are 67600 possible combinations of numeric values for preceding characters P0, P1, P2, and P3. Although the numbers in the coefficients in FIG. 14 are represented in base 10 for clarity, when computing the unique binary value UBV, the base 10 numeric values of the coefficients and the numeric values of the encoded characters (e.g., the numeric values of the digits and letters of string P) are represented in binary (i.e., in base 2, as "1s" and "0s"). The mapping provided by unique binary value encoding function 152 is unique in that no two character strings PA and PB will map to the same binary value UBV, when PA is not the same as PB.

To ensure that the operation of the format-preserving encryption and decryption functions of FIGS. 5 and 6 are successful at preserving the format of a binary-encoded string, care should be taken that the binary values that are produced during encryption and decryption operations are format compliant. The encrypted version of the binary-encoded string that is produced at the output of step 72 in FIG. 5 should be format compliant to ensure that the postprocessed string that is produced at the output of step 74 of FIG. 5 is in the same format as the string originally obtained at step 66. Similarly, the decrypted version of the binary-encoded string that is produced at the output of step 90 of FIG. 6 should be format compliant to ensure that the postprocessed string produced following the operations of step 92 of FIG. 6 is in the same format as the string originally obtained at step 84.

Encoded binary values are considered to be format compliant when their unencoded form lies within the same range of values as their original form. Consider, as an example, the character "9". This character is a digit and can be numerically represented by the base 10 number "9." In binary, the number 9 is 1001. Using a block cipher of the type described in connection with FIG. 3, encryption operations may be performed that transform the unencrypted binary value 1001 to an encrypted value of 1111 (as an example). This binary value is not format compliant, because it corresponds to a base 10 value of "15," which is not within the permissible range for a single digit (i.e., "15" does not lie within the range of "0," "1", "2," . . . "9"). The same type of problem can occur during decryption if the decrypted version of a binary-encoded value at the output of step 90 is not format compliant.

To ensure that encrypted and decrypted values are format compliant, the block cipher operations of step 72 (FIG. 5) and step 90 (FIG. 6) can be repeated while checking the output of the cipher for format compliance. Each iteration of the block cipher will modify the binary output. Eventually, the binary output of the block cipher will be format compliant, at which point no further iterations of the block cipher are performed.

Figure 15:
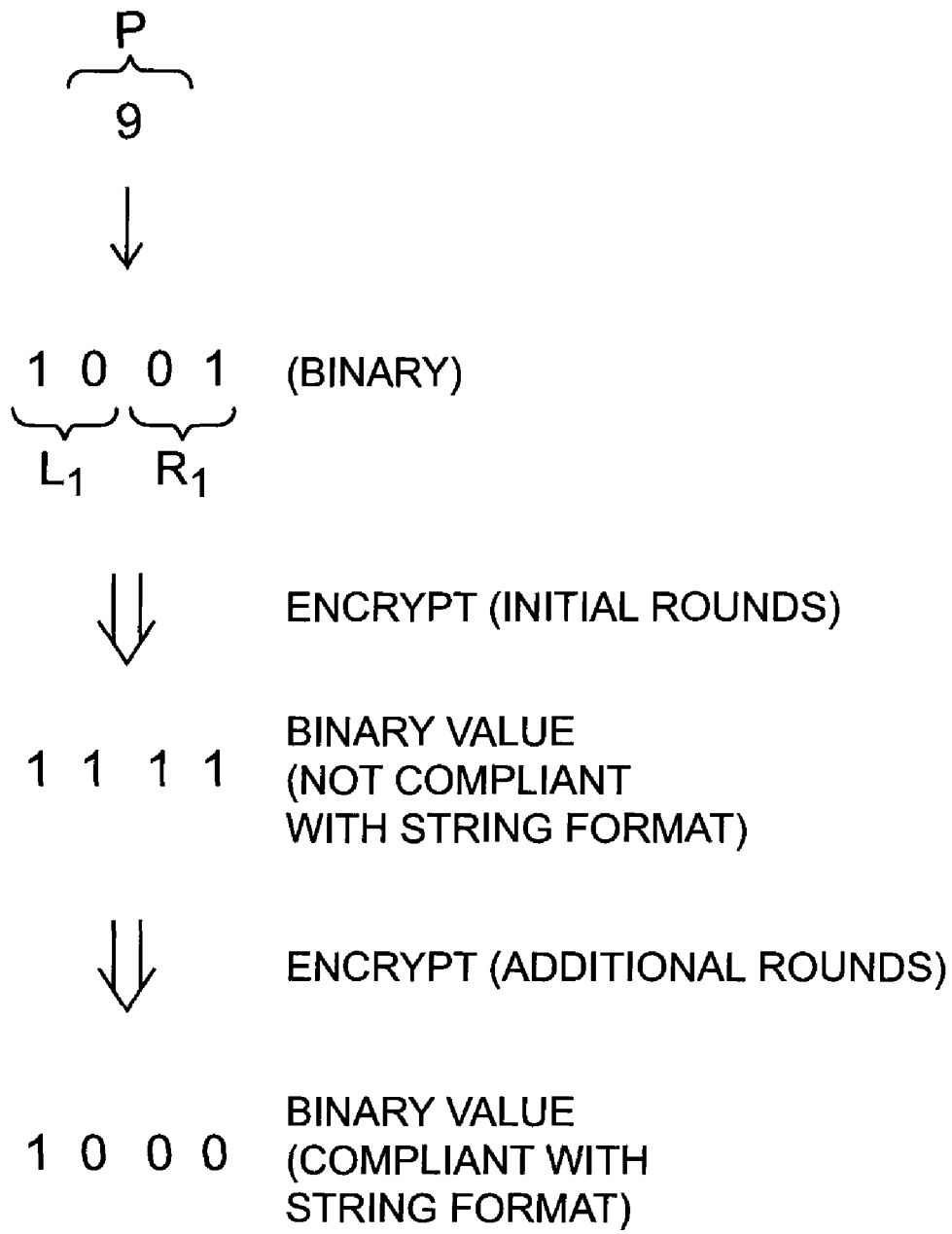
FIG. 15 is a diagram showing how a string format may be preserved when converting a string to a binary value in accordance with an embodiment of the present invention.

This type of arrangement is shown in FIG. 15. In the example of FIG. 15, an unencrypted string P is being encrypted. The string P in the FIG. 15 example is the digit "9."

Using an index in which digits are mapped to corresponding numeric values (i.e., "0" is mapped to "0," "1" is mapped to "1," . . . and "9" is mapped to "9"), the string P is converted to a numeric value of 9. In binary-encoded format, the unencrypted encoded version of string P is 1001. As shown in FIG. 15, the left half of the binary-encoded version of P ("10") is used as the input L1 to the block cipher of FIG. 3 and the right half of the binary-encoded version of P ("01") is used as the input R1 to the block cipher of FIG. 3.

As described in connection with FIG. 3, a certain number of rounds of the block cipher (e.g., eight rounds) may be used to perform an initial encryption operation on the binary-encoded value 1001. In the FIG. 15 example, this initial encoding operation results in the binary value of 1111. If this value were format compliant, the encryption process would be complete. However, in the present example, the binary value of 1111 is not format compliant, because it corresponds to a base 10 numeric value of 15, which is not within the permissible range numeric values for a digit (i.e., 15 does not lie within the range of 0-9, so the string "15" is not in the same format as the original string "9"). As a result, additional rounds of the block cipher are performed (e.g., an additional eight rounds). This produces the encrypted binary value 1000 (in the FIG. 15 example). Because the binary value 1000 corresponds to a base 10 numeric value of 8, which lies within the permissible digit numeric values of 0-9, the binary value 1000 forms a proper format-compliant encrypted binary-encoded version of string P. No further rounds of the block cipher need be performed.

Decryption operations may be performed in the same way. If, following an initial application of a given number of rounds of the block cipher, the initial binary value of a string that is produced is not format compliant, additional decryption operations can be performed. As soon as a binary output is produced that is format compliant, the block cipher operations may be terminated and the binary value may be converted into an appropriately formatted string of characters (e.g., letters and digits), as described in connection with step 92.

Figure 16:
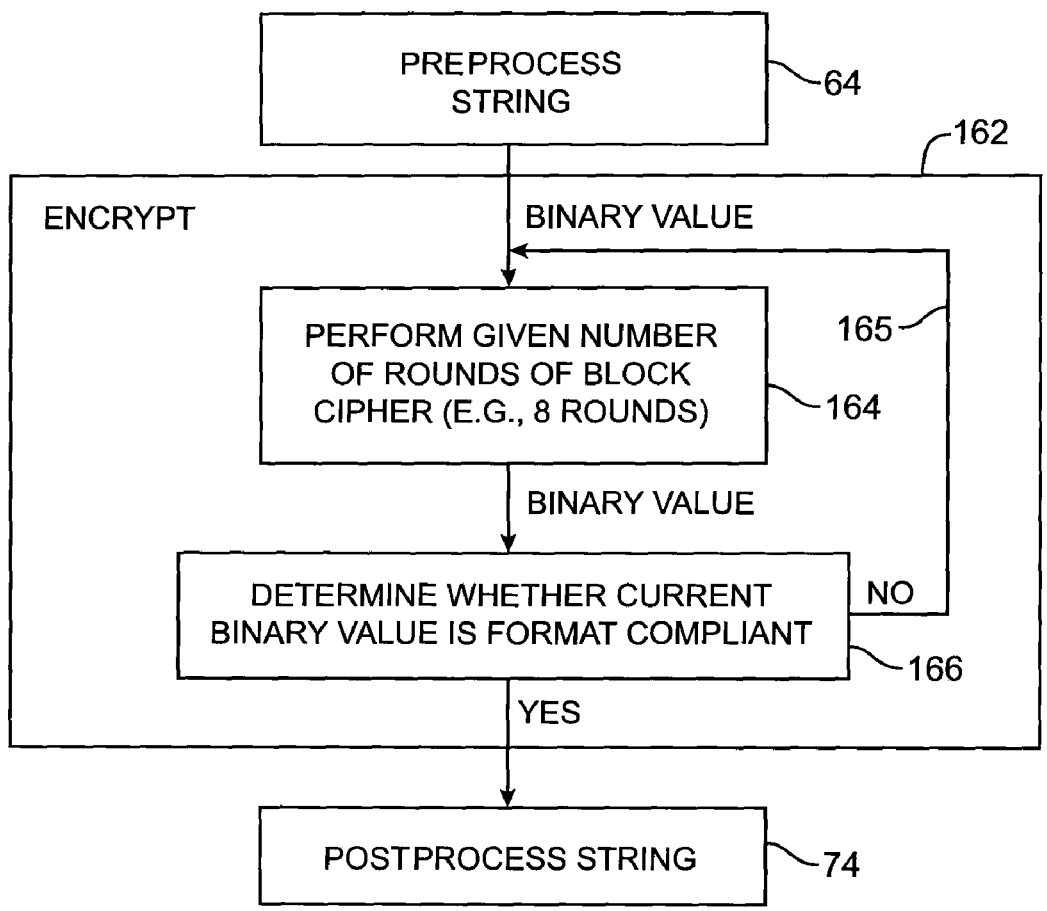
FIG. 16 a flow chart of illustrative steps involved in using a format-preserving encryption engine to encrypt a data string represented using a unique binary value in accordance with an embodiment of the present invention.

Illustrative steps involved in performing format-preserving encryption operations on a string using one or more repeated iterations of a block cipher to ensure format compliance are shown in FIG. 16.

As shown in FIG. 16, a data string may be preprocessed at step 64, encrypted at step 162, and postprocessed at step 74.

As described in connection with steps 66, 68, and 70 of FIG. 5, during step 64, encryption engine 26 may obtain the unencrypted string from a database 18 or an application 16 and may process the string to identify relevant characters. Dashes spaces, checksums, and other undesired characters can be removed from the string and the relevant characters in the string can be retained. Encryption engine 26 may then use the index mappings that were created during step 54 of FIG. 4 to convert the processed string (i.e., the string from which the irrelevant characters have been removed) into an encoded unencrypted string. For example, each digit in the string may be converted into a corresponding numeric value from 0-9, each letter in the string may be converted into a corresponding numeric value from 0-25, etc. During these encoding operations, encryption engine 26 may use a formula such as formula 152 of FIG. 14 to encode the string to a unique binary value. The actual formula that is used during encoding depends on the nature of the string's format. The values used for coefficients 154, 156, 158, and 160 in FIG. 14 are applicable to a situation in which the string has the format "digit, letter, digit, digit, and letter," as shown at the top of FIG. 14.

For strings with other formats, different coefficients may be used in the unique binary value encoding function represented by formula 152.

After preprocessing the string so that the string is represented as a unique encoded binary value, block cipher format-preserving encryption operations may be performed at step 162. During the operations of step 162, the binary-encoded string may be processed using a block cipher such as a block cipher of the type shown in FIG. 3. As shown in FIG. 16, the block cipher may be applied to the binary-encoded string at step 164. The operations of step 164 may involve any suitable number of rounds of the block cipher. For example, during step 164, eight rounds of the block cipher may be performed. The use of eight rounds of the block cipher is, however, merely illustrative. Any suitable number of rounds of the block cipher may be performed at step 164 if desired.

As a result of the block cipher operations of step 164, the binary value obtained from step 64 is converted to an encrypted binary value. At step 166, the encrypted binary value that is produced at step 164 is analyzed to determine whether it is format compliant. As described in connection with FIG. 15, when a binary value is operated on by the block cipher, the resulting binary value at the output of the block cipher may not match the format of the original input string. If it is determined at step 166 that the format of the string no longer matches the format of the original string (e.g., if a digit has been transformed into a value that no longer falls within its allowed range of 0-9 as described in connection with FIG. 15), processing can loop back to step 164, as indicated by line 165. In this situation, the current block cipher can again be applied to the binary value. By applying the block cipher to the current block cipher output, the block cipher can update the current block cipher output. This loop can continue until it is determined during step 166 that the format of the encrypted binary value (the current block cipher output) matches the format of the original string obtained at step 64. When it is determined during step 166 that the encrypted binary value output by the block cipher is format compliant, processing may proceed to step 74.

During the operations of step 74, the same unique binary value encoding function that was used during the encoding operations of step 64 and the same index mappings that were used during the encoding operations of step 64 are used to convert the encrypted string back into characters (i.e., characters in the legal set of character values that were defined for each character position). Decoding the encoded version of the string using the unique binary value encoding function and index mappings returns the string to its original character set.

The decoded encrypted string may then be processed to restore elements such as dashes and spaces that were removed during the preprocessing operations of step 64. When replacing a checksum value, a new valid checksum value can be computed from the encrypted version of the string and validity period information or other suitable information can be embedded within the checksum digit (e.g., by adding a validity period index to the new valid checksum value to produce a checksum digit for the decoded encrypted string). The decoded encrypted string is ciphertext that corresponds to the plaintext unencrypted string that was obtained at step 64. If desired, the entire string can be encrypted. With this type of arrangement, the checksum removal operation and the checksum digit computation operation of can be omitted.

By processing the string during step 74, the extraneous elements of the string that were removed during step 64 may be inserted back into the string. Because the extraneous elements are reinserted into the string and because a format-preserving block cipher encryption process was used during step 162, the encrypted string that is produced will have the same format as the original unencrypted string. This allows the encrypted string to be used by applications 16 and databases 18 that require that the original string's format be used. When the encrypted string is provided to an application 16 or database 18, legacy applications and databases that require a specific string format may be able to accept the encrypted string.

Figure 17:
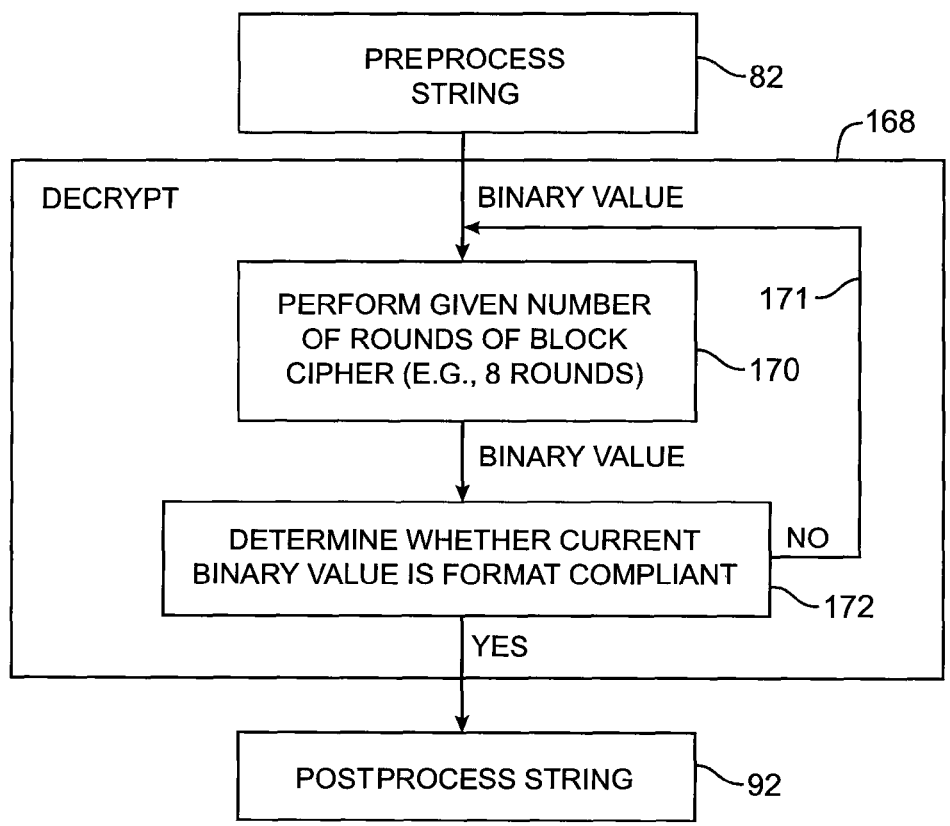
FIG. 17 is a flow chart of illustrative steps involved in using a format-preserving decryption engine to decrypt a data string represented using a unique binary value in accordance with an embodiment of the present invention.

Illustrative steps involved in performing format-preserving decryption operations on a string using one or more repeated iterations of a block cipher to ensure format compliance are shown in FIG. 17.

As shown in FIG. 17, a data string may be preprocessed at step 82, decrypted at step 168, and postprocessed at step 92.

During step 82, the decryption engine obtains the encrypted string. The encrypted string may be retrieved from a database 18 or received from an application 16. The encrypted string is processed to identify relevant characters. For example, dashes spaces, checksums, and other extraneous elements can be removed from the string, whereas relevant characters in the string can be retained. The process of removing extraneous characters during step 82 is the same as that used during the processing of the unencrypted string that was performed during step 68 of FIG. 5 (step 64 of FIG. 16). After extraneous characters have been removed, decryption engine 28 may use the index mappings that were defined at step 54 of FIG. 4 to convert the processed string (i.e., the string from which the irrelevant characters have been removed) into an encoded encrypted string. For example, each digit in the string may be converted into a corresponding numeric value from 0-9, each letter in the string may be converted into a corresponding numeric value from 0-25, etc. During these encoding operations, decryption engine 28 may use a formula such as formula 152 of FIG. 14 to encode the string to a unique binary value. As with the encoding operations performed during preprocessing step 64 of FIG. 16, the formula that is used during the encoding of step 82 depends on the nature of the string's format. The values used for coefficients 154, 156, 158, and 160 in the FIG. 14 example are merely illustrative.

After preprocessing the string so that the string is represented as a unique encoded binary value, format-preserving decryption operations may be performed at step 168. During the operations of step 168, the binary-encoded string may be processed using a block cipher such as a block cipher of the type shown in FIG. 3. The block cipher may be applied to the binary-encoded string at step 170. The operations of step 170 may involve any suitable number of rounds of the block cipher. For example, eight rounds of the block cipher may be performed during step 170.

As a result of the block cipher operations of step 170, the binary value obtained from step 82 is converted to another binary value. If only one pass through loop 165 of FIG. 16 was used during encryption, a single pass through decryption step 170 will be sufficient to convert the binary value from step 82 into a decrypted binary value. If more passes through loop 165 were used to produce the format-compliant encrypted string, a correspondingly increased number of passes through loop 171 will be required during decryption operations.

At each step 172, the binary value that was produced at step 170 by application of the decrypting block cipher is analyzed to determine whether the binary value is format compliant. When the block cipher is applied to a binary value, the resulting updated binary value at the output of the block cipher may not match the format of the original input string. If it is determined at step 172 that the format of the data string represented by the current binary value (i.e., the current version of the block cipher output) does not match its original format (e.g., if a digit has been transformed into a value that no longer falls within its allowed range of 0-9), processing can loop back to step 170, as indicated by line 171. In this situation, the decrypting block cipher can again be applied to the binary value at step 170 to update the block cipher output. This loop can continue until it is determined during step 172 that the format of the current binary value produced at the output of the decrypting block cipher matches the format of the original encrypted string obtained at step 82. When it is determined during step 172 that the binary value output by the block cipher is format compliant, the encrypted string has been successfully decrypted and processing may proceed to step 92.

During step 92, the index mappings and unique binary encoding scheme that were used during the encoding operations of step 82 may be used to convert the index values of the decrypted string back into their associated characters (i.e., characters in the legal set of character values that were defined for each character position). This returns the decrypted string to its original character set. In strings that contain more than one different type of character, multiple different index mappings may be used. The decoded decrypted string may then be processed to restore elements such as dashes, spaces, and checksum values that were removed. When replacing a checksum value, a new valid checksum value may be computed from the decrypted version of the string. This ensures that the decrypted version of the string will be returned to its original valid state.

During the string processing operations of step 92, the extraneous elements of the string that were removed at step 82 are inserted back into the string. This restores the string to its original unencrypted state, so that the decrypted string may be provided to an application 16 or database 18.

The foregoing is merely illustrative of the principles of this invention and various modifications can be made by those skilled in the art without departing from the scope and spirit of the invention.

What is claimed is:

1. A method for performing encryption at computing equipment, comprising:
    with an encryption engine on computing equipment, obtaining an encoded binary value representing an unencrypted string in a given format, wherein obtaining the encoded binary value comprises:
        obtaining the unencrypted string in the given format; and
        encoding the unencrypted string to produce the encoded binary value;
    with the encryption engine on the computing equipment, applying a block cipher to the encoded binary value to produce a block cipher output;
    after each application of the block cipher, with the encryption engine on the computing equipment, determining whether the block cipher output is representative of a string in the given format;
    whenever it is determined that the block cipher output is not representative of a string in the given format, with the encryption engine on the computing equipment, applying the block cipher an additional time to update the block cipher output; and
    when it is determined that the block cipher output is representative of a string in the given format, with the encryption engine on the computing equipment, processing the block cipher output to produce an encrypted version of the unencrypted string.

2. The method defined in claim 1 wherein processing the block cipher output comprises converting the block cipher output from binary to characters.

3. The method defined in claim 1 wherein encoding the unencrypted string to produce the encoded binary value comprises encoding the string as a unique binary value.

4. The method defined in claim 3 wherein encoding the unencrypted string comprises converting the string to numeric values and multiplying the numeric values by coefficients.

5. The method defined in claim 4, wherein a given one of the coefficients is associated with a given character in the string, the method further comprising with the encryption engine on the computing equipment, computing the given one of the coefficients by computing a product of a set of numbers each of which represents how many possible character values are associated with a respective character in the string prior to the given character.

6. A method for performing encryption at computing equipment, comprising:
    with an encryption engine on computing equipment, obtaining an encoded binary value representing an unencrypted string in a given format;
    with the encryption engine on the computing equipment, applying a block cipher to the encoded binary value to produce a block cipher output;
    after each application of the block cipher, with the encryption engine on the computing equipment, determining whether the block cipher output is representative of a string in the given format;
    whenever it is determined that the block cipher output is not representative of a string in the given format, with the encryption engine on the computing equipment, applying the block cipher an additional time to update the block cipher output; and
    when it is determined that the block cipher output is representative of a string in the given format, with the encryption engine on the computing equipment, processing the block cipher output to produce an encrypted version of the unencrypted string, wherein processing the block cipher output comprises restoring removed string elements to the encrypted version of the unencrypted string.

7. A method for performing decryption at computing equipment, comprising:
    with a decryption engine on computing equipment, obtaining an encoded binary value representing an encrypted string in a given format, wherein obtaining the encoded binary value comprises:
        obtaining the encrypted string in the given format; and
        encoding the encrypted string to produce the encoded binary value;
    with the decryption engine on the computing equipment, applying a block cipher to the encoded binary value to produce a block cipher output;
    after each application of the block cipher, with the decryption engine on the computing equipment, determining whether the block cipher output is representative of a string in the given format;
    whenever it is determined that the block cipher output is not representative of a string in the given format, with the decryption engine on the computing equipment, applying the block cipher an additional time to update the block cipher output; and
    when it is determined that the block cipher output is representative of a string in the given format, with the decryption engine on the computing equipment, processing the block cipher output to produce a decrypted version of the encrypted string.

8. The method defined in claim 7 wherein processing the block cipher output comprises converting the block cipher output from binary to characters.

9. The method defined in claim 7 wherein encoding the encrypted string to produce the encoded binary value comprises encoding the encrypted string as a unique binary value.

10. The method defined in claim 9 wherein encoding the encrypted string comprises converting the string to numeric values and multiplying the numeric values by coefficients.

11. The method defined in claim 10, wherein a given one of the coefficients is associated with a given character in the string, the method further comprising with the decryption engine on the computing equipment, computing the given one of the coefficients by computing a product of a set of numbers each of which represents how many possible character values are associated with a respective character in the string prior to the given character.

12. A method for performing decryption at computing equipment, comprising:
   with a decryption engine on computing equipment, obtaining an encoded binary value representing an encrypted string in a given format;
   with the decryption engine on the computing equipment, applying a block cipher to the encoded binary value to produce a block cipher output;
   after each application of the block cipher, with the decryption engine on the computing equipment, determining whether the block cipher output is representative of a string in the given format;
   whenever it is determined that the block cipher output is not representative of a string in the given format, with the decryption engine on the computing equipment, applying the block cipher an additional time to update the block cipher output; and
   when it is determined that the block cipher output is representative of a string in the given format, with the decryption engine on the computing equipment, processing the block cipher output to produce a decrypted version of the encrypted string, wherein processing the block cipher output comprises restoring removed string elements to the decrypted version of the encrypted string.

13. A method for using at least first and second cryptographic keys to provide at least first and second users with selective access to the contents of a string, comprising:
   with format-preserving encryption at an encryption engine on computing equipment, encrypting a first plaintext part of the string using the first cryptographic key to produce first ciphertext that is in the same format as the first plaintext part while leaving a second plaintext part of the string unencrypted;
   with format-preserving encryption at the encryption engine on the computing equipment following encryption of the first plaintext part of the string, encrypting both the second plaintext part of the string and the first ciphertext using the second cryptographic key to produce second ciphertext, wherein the second ciphertext is in the same format as the string;
   providing the first and second keys to the first user; and
   providing the second key to the second user without providing the first key to the second user.

14. The method defined in claim 13 further comprising:
   at the second user, decrypting the second ciphertext for the second user to produce the first ciphertext part and the second plaintext part.

15. The method defined in claim 14 further comprising:
   at the first user, decrypting the first ciphertext part to produce the first plaintext part.

16. The method defined in claim 15 wherein the decrypting the first ciphertext part comprises decrypting the first ciphertext part using a block cipher.

\* \* \* \* \*